US012783787B2

(12) United States Patent
Pathan et al.

(10) Patent No.: US 12,783,787 B2
(45) Date of Patent: Nov. 3, 2026

(54) LOGICAL TEXT PASSAGE GENERATION AND RETRIEVAL FOR RETRIEVAL-AUGMENTED GENERATION

(71) Applicant: Amazon Technologies, Inc., Seattle, WA (US)

(72) Inventors: Shahebaj Mahemood Pathan, Sunnyvale, CA (US); Ankit Ashvin Bhodia, Mountain View, CA (US); Vinayshekhar Bannihatti Kumar, Santa Clara, CA (US); Sopan Khosla, Sunnyvale, CA (US); Ruiyang Li, Santa Clara, CA (US); Ramya Kota Ural, Fremont, CA (US); Paramvir Singh, Fremont, CA (US); Rashmi Gangadharaiah, San Jose, CA (US); Kavisha Arora, Palo Alto, CA (US)

(73) Assignee: Amazon Technologies, Inc., Seattle, WA (US)

(*) Notice: Subject to any disclaimer, the term of this patent is extended or adjusted under 35 U.S.C. 154(b) by 386 days.

(21) Appl. No.: 18/615,852

(22) Filed: Mar. 25, 2024

(65) Prior Publication Data

US 2025/0298962 A1 Sep. 25, 2025

(51) Int. Cl.
*G06F 16/31* (2019.01)
*G06F 16/3329* (2025.01)
(Continued)

(52) U.S. Cl.
CPC ............ *G06F 40/143* (2020.01); *G06F 16/31* (2019.01); *G06F 16/3329* (2019.01);
(Continued)

(58) Field of Classification Search
None
See application file for complete search history.

(56) References Cited

U.S. PATENT DOCUMENTS

| | | | | |
|---|---|---|---|---|
| 12,216,709 B1 * | 2/2025 | Xie | ...................... | H04N 21/232 |
| 12,632,744 B1 * | 5/2026 | Tang | ...................... | G06N 5/022 |

(Continued)

FOREIGN PATENT DOCUMENTS

| | | |
|---|---|---|
| CN | 109074292 A | 12/2018 |
| CN | 117076629 A | 11/2023 |
| WO | 2017/184587 A1 | 10/2017 |

OTHER PUBLICATIONS

International Search Report and Written Opinion, PCT App. No. PCT/US2025/020432, Jun. 20, 2025, 10 pages.

*Primary Examiner* — Eddy Cheung
(74) *Attorney, Agent, or Firm* — Nicholson DeVos Webster & Elliott LLP

(57) ABSTRACT

Techniques for logical text passage generation and retrieval for retrieval-augmented generation. The techniques involve processing markup language documents to generate logical text passages and their corresponding embeddings. These embeddings are indexed for efficient retrieval. Upon receiving a user utterance, a user query is formed and transformed into an embedding to query the index. Relevant text passages are identified and used to prompt a large language model (LLM), which generates a completion. This completion is then sent as a response to the user. The process effectively bridges user queries with relevant information through advanced embedding and natural language processing techniques, enabling accurate and contextually appropriate interactions within a user-agent dialogue framework.

20 Claims, 15 Drawing Sheets

(51) Int. Cl.

| | |
|---|---|
| ***G06F 16/958*** | (2019.01) |
| ***G06F 40/103*** | (2020.01) |
| ***G06F 40/143*** | (2020.01) |
| ***G06F 40/35*** | (2020.01) |
| ***G06F 40/40*** | (2020.01) |
| *G06V 30/19* | (2022.01) |
| *G06V 30/414* | (2022.01) |

(52) U.S. Cl.

CPC .......... *G06F 16/986* (2019.01); *G06F 40/103* (2020.01); *G06F 40/35* (2020.01); *G06F 40/40* (2020.01); *G06V 30/191* (2022.01); *G06V 30/414* (2022.01)

(56) References Cited

U.S. PATENT DOCUMENTS

| | | | |
|---|---|---|---|
| 2021/0173682 A1 | 6/2021 | Chakraborti et al. | |
| 2024/0412720 A1* | 12/2024 | Vasylyev .......... | G06F 16/90332 |
| 2025/0053582 A1 | 2/2025 | Yao et al. | |
| 2025/0086467 A1* | 3/2025 | Yee ...................... | G06N 3/0475 |

* cited by examiner

Content-Number: 0
Content-UUID: 454d938515e9f15cfc1294ee637bdb80ad8032f8 402
Content-Parent-UUID: None
Content-Child-UUIDs: ['67bf9a081638c4eda40fe1b7be54633778d8b00d', 'a958ef36ec952d599241af899f800edb72dbb46c', 'ac8517c45b0c05096ce20f8268fcf5b51f28dcde', 'db2148a8be72d70efaa3e1b2d163c8f96c6989e3','c322ce4e6c7c615d8c3fc3c5cc050ddbcdf95b7a', 'd1d1bc19df19c6044afc33df6cafe8b0598a1ec1', 'e40a9cbfe17a32a7cdfa0651698046881e52e574']
Previous-Chunk-UUIDs: None
Next-Chunk-UUIDs: 67bf9a081638c4eda40fe1b7be54633778d8b00d
Getting Started with the AWS Management Console Content-Number: 1
Content-UUID: 67bf9a081638c4eda40fe1b7be54633778d8b00d 404
Content-Parent-UUID: 454d938515e9f15cfc1294ee637bdb80ad8032f8
Content-Child-UUIDs: []
Previous-Chunk-UUIDs: 454d938515e9f15cfc1294ee637bdb80ad8032f8
Next-Chunk-UUIDs: a958ef36ec952d599241af899f800edb72dbb46c
GETTING STARTED GUIDE Content-Number: 2
Content-UUID: a958ef36ec952d599241af899f800edb72dbb46c 406
Content-Parent-UUID: 454d938515e9f15cfc1294ee637bdb80ad8032f8
Content-Child-UUIDs: []
Previous-Chunk-UUIDs: 67bf9a081638c4eda40fe1b7be54633778d8b00d
Next-Chunk-UUIDs: ac8517c45b0c05096ce20f8268fcf5b51f28dcde
Overview The AWS Management Console is a web application that comprises a broad collection of service consoles for managing AWS resources. When you first sign in, you see the Console Home page. The home page provides access to each service console and offers a single place to access the information you need to perform your AWS related tasks. You can also customize the Console Home page by adding, removing, and rearranging widgets, such as recently visited, AWS Health, Trusted Advisor, and more.

The individual service consoles, on the other hand, offer a wide range of tools for cloud computing, as well as information about your account and about your billing.

*FIG. 7*

Content-Number: 3
Content-UUID: ac8517c45b0c05096ce20f8268fcf5b51f28dcde
Content-Parent-UUID: 454d938515e9f15cfc1294ee637bdb80ad8032f8
Content-Child-UUIDs: []
Previous-Chunk-UUIDs: a958ef36ec952d599241af899f800edb72dbb46c
Next-Chunk-UUIDs: db2148a8be72d70efaa3e1b2d163c8f96c6989e3
What You Will Learn In this guide, you will learn:

* The different sections of the Console Home
* How to access account information
* How to switch AWS Regions
* How to work with widgets on the Console Home

408

Content-Number: 4
Content-UUID: db2148a8be72d70efaa3e1b2d163c8f96c6989e3
Content-Parent-UUID: 454d938515e9f15cfc1294ee637bdb80ad8032f8
Content-Child-UUIDs: []
Previous-Chunk-UUIDs: ac8517c45b0c05096ce20f8268fcf5b51f28dcde
Next-Chunk-UUIDs: c322ce4e6c7c615d8c3fc3c5cc050ddbcdf95b7a
Prerequisites Before starting this guide, you will need:

* An AWS account: if you don't already have one, follow the [Setting Up Your Environment](/getting-started/guides/setupenvironment/) getting started guide for a quick overview.

410

FIG. 8

Content-Number: 0
Content-UUID: 4d75ab91119ea749df9236685827c6932bf180a1 502
Content-Parent-UUID: None
Content-Child-UUIDs: ['51b5cc23d02f49ea23a3a1d265d05391ec35231c', '5a3d81adedf59ce7f09631e14e0a2a9cae60b713', '4b20368489c256c699e7a8672e6db8cb2580d154', '5cd1a30fe54c8cadff29cf6a243d35e3a2bb1a11']
Previous-Chunk-UUIDs: None
Next-Chunk-UUIDs: 51b5cc23d02f49ea23a3a1d265d05391ec35231c
Buckets overview To upload your data (photos, videos, documents, etc.) to Amazon S3, you must first create an S3 bucket in one of the AWS Regions.

A bucket is a container for objects stored in Amazon S3. You can store any number of objects in a bucket and can have up to 100 buckets in your account. To request an increase, visit the [Service Quotas console](https://console.aws.amazon.com/servicequotas/home/services/s3/quotas/).

Every object is contained in a bucket. For example, if the object named `photos/puppy.jpg` is stored in the `DOC-EXAMPLEBUCKET` bucket in the US West (Oregon) Region, then it is addressable by using the URL `https://DOC-EXAMPLEBUCKET. s3.us-west-2.amazonaws.com/photos/puppy.jpg`. For more information, see [Accessing a Bucket](./access-bucketintro.html).

In terms of implementation, buckets and objects are AWS resources, and Amazon S3 provides APIs for you to manage them. For example, you can create a bucket and upload objects using the Amazon S3 API. You can also use the Amazon S3 console to perform these operations. The console uses the Amazon S3 APIs to send requests to Amazon S3.

This section describes how to work with buckets. For information about working with objects, see [Amazon S3 objects overview](./UsingObjects.html).

Amazon S3 supports global buckets, which means that each bucket name must be unique across all AWS accounts in all the AWS Regions within a partition. A partition is a grouping of Regions. AWS currently has three partitions: `aws` (Standard Regions), `aws-cn` (China Regions), and `aws-us-gov` (AWS GovCloud (US)).

After a bucket is created, the name of that bucket cannot be used by another AWS account in the same partition until the bucket is deleted. You should not depend on specific bucket naming conventions for availability or security verification purposes. For bucket naming guidelines, see [Bucket naming rules](./bucketnamingrules.html).

*FIG. 9*

504

Content-Number: 1
Content-UUID: 51b5cc23d02f49ea23a3a1d265d05391ec35231c
Content-Parent-UUID: 4d75ab91119ea749df9236685827c6932bf180a1
Content-Child-UUIDs: []
Previous-Chunk-UUIDs: 4d75ab91119ea749df9236685827c6932bf180a1
Next-Chunk-UUIDs: 5a3d81adedf59ce7f09631e14e0a2a9cae60b713
Amazon S3 creates buckets in a Region that you specify. To reduce latency, minimize costs, or address regulatory requirements, choose any AWS Region that is geographically close to you. For example, if you reside in Europe, you might find it advantageous to create buckets in the Europe (Ireland) or Europe (Frankfurt) Regions. For a list of Amazon S3 Regions, see [Regions and Endpoints](https://docs.aws.amazon.com/general/latest/gr/s3.html) in the *AWS General Reference*.

Note

Objects that belong to a bucket that you create in a specific AWS Region never leave that Region, unless you explicitly transfer them to another Region. For example, objects that are stored in the Europe (Ireland) Region never leave it.
* Topics

* [About permissions](#about-access-permissions-create-bucket)
* [Managing public access to buckets](#block-public-access-intro)
* [Bucket configuration options](#bucket-config-options-intro)

*FIG. 10*

Content-Number: 0
Content-UUID: 4236cfaa24f5a7c9fc363faeeee17606afa3eefa5d133659670e2bf28b345ebf 602
Content-Parent-UUID: None
Content-Child-UUIDs: []
Previous-Chunk-UUIDs: None
Next-Chunk-UUIDs: None
Q: What is Amazon Elastic Compute Cloud (Amazon EC2)? Amazon EC2 is a web service that provides resizable compute capacity in the cloud. It is designed to make web-scale computing easier for developers.

Content-Number: 1
Content-UUID: 42a47b86e70181b1fbc8827d8b4c20b8c401781996b7c3bba4a94c93fb4a9f44 604
Content-Parent-UUID: None
Content-Child-UUIDs: []
Previous-Chunk-UUIDs: None
Next-Chunk-UUIDs: None
Q: What can I do with Amazon EC2? Just as Amazon Simple Storage Service (Amazon S3) enables storage in the cloud, Amazon EC2 enables “compute” in the cloud. The Amazon EC2 simple web service interface allows you to obtain and configure capacity with minimal friction. It provides you with complete control of your computing resources and lets you run on Amazon’s proven computing environment. Amazon EC2 reduces the time required to obtain and boot new server instances to minutes, allowing you to quickly scale capacity, both up and down, as your computing requirements change. Amazon EC2 changes the economics of computing by allowing you to pay only for capacity that you actually use.

Content-Number: 2
Content-UUID: e65c6d9f1f5b74d2c66b59c80fc997155696a617eff13a91349754d8c348a37d 606
Content-Parent-UUID: None
Content-Child-UUIDs: []
Previous-Chunk-UUIDs: None
Next-Chunk-UUIDs: None
Q: How can I get started with Amazon EC2? To sign up for Amazon EC2, select the “Sign up for This Web Service” button on the Amazon EC2 detail page. You must have an AWS account to access this service; if you do not already have one, you will be prompted to create one when you begin the Amazon EC2 signup process. After signing up, please refer to the Amazon EC2 documentation, which includes our Getting Started Guide.

*FIG. 11*

Content-Number: 3
Content-UUID: ee5cae546ae92d0fecd825a160679e9829c83d5331af3585608dcc0234d7b83f 608
Content-Parent-UUID: None
Content-Child-UUIDs: []
Previous-Chunk-UUIDs: None
Next-Chunk-UUIDs: None
Q: Why am I asked to verify my phone number when signing up for Amazon EC2? Amazon EC2 registration requires you to have a valid phone number and email address on file with AWS in case we ever need to contact you. Verifying your phone number takes only a couple of minutes and involves receiving a phone call during the registration process and entering a PIN using the phone key pad.

Content-Number: 4
Content-UUID: 0b46931e663a11b6f5b7b8f4bd9299fcadcd4475ca8f0e6ecadf65c76b3c716a 610
Content-Parent-UUID: None
Content-Child-UUIDs: []
Previous-Chunk-UUIDs: None
Next-Chunk-UUIDs: None
Q: What can developers now do that they could not before? Until now, small developers did not have the capital to acquire massive compute resources and ensure they had the capacity they needed to handle unexpected spikes in load. Amazon EC2 helps developers use Amazon's own benefits of massive scale with no upfront investment or performance compromises. Developers are now free to innovate knowing that no matter how successful their businesses become, it will be inexpensive and simple to ensure they have the compute capacity they need to meet their business requirements.

*FIG. 12*

LOGICAL TEXT PASSAGE GENERATION AND RETRIEVAL FOR RETRIEVAL-AUGMENTED GENERATION

BACKGROUND

Retrieval-Augmented Generation (RAG) is an approach in natural language processing (NLP) that combines the strengths of two major components: a retrieval system and a generative model. The process begins with the retrieval system, which searches a large database or corpus of documents to find relevant information based on a given query or prompt. This retrieved information, typically in the form of documents, text passages, or facts, is then provided to the generative model. The generative model, often a large-scale language model like GPT (Generative Pre-trained Transformer), uses the retrieved information as additional context or evidence to generate responses, answers, or content that is informed by external knowledge.

RAG allows generative models to produce more accurate, relevant, and informed outputs than standalone generative models, as they can leverage external information that may not be contained within their initial training data. RAG models are particularly useful for tasks that require deep understanding and incorporation of external knowledge, such as question answering, content creation, and complex decision-making scenarios. By dynamically integrating retrieval into the generation process, RAG models bridge the gap between knowledge-based and generative approaches in artificial intelligence (AI), offering a powerful tool for enhancing the capabilities of NLP systems.

BRIEF DESCRIPTION OF THE DRAWINGS

The detailed description of certain embodiments of the invention are understood with reference to the following figures:

FIG. 7 depicts example text passages corresponding to the example of FIG. 4.

FIG. 8 depicts example text passages corresponding to the example of FIG. 5.

FIG. 9 depicts example text passages corresponding to the example of FIG. 6.

FIG. 10 depicts example text passages corresponding to the example of FIG. 6.

FIG. 11 depicts example text passages corresponding to the example of FIG. 7.

FIG. 12 depicts example text passages corresponding to the example of FIG. 7.

DETAILED DESCRIPTION

Figure 1:
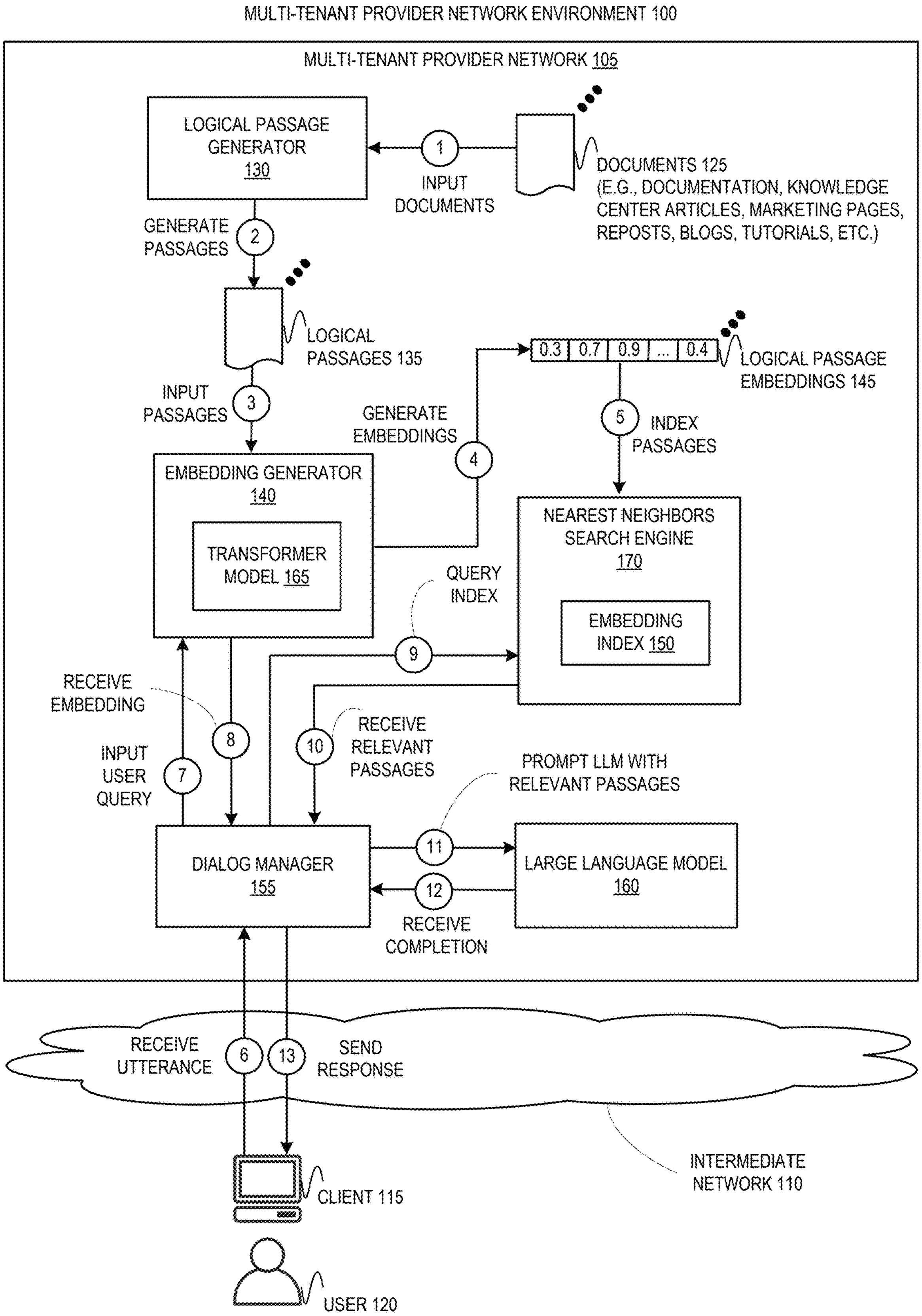
FIG. 1 illustrates an example system and method for logical text passage generation and retrieval for retrieval-augmented generation.

Disclosed herein are systems, methods, and non-transitory computer-readable media (generally, "techniques") for logical text passage generation and retrieval for retrieval-augmented generation.

Techniques within a multi-tenant provider network environment encompass an approach to processing user queries and generating responses. Initially, markup language documents are inputted into a logical text passage generator, which then produces a set of logical text passages. These passages are subsequently fed into an embedding generator to create embeddings, which are then indexed for efficient retrieval. When a user utterance is received, it is transformed into a query and input into the embedding generator to produce a relevant embedding. This embedding is used to query the index, retrieving text passages that are pertinent to the query. These passages are then used to prompt a large language model, which generates a response. Finally, this response, cither as is or further processed, is sent back to the user. This method leverages advanced embedding and natural language processing techniques to facilitate accurate, contextually relevant interactions between the user and the system, enhancing the efficiency and effectiveness of the provider network's response mechanism to user queries.

The technical benefits of the techniques include enhancing both efficiency and effectiveness in handling user queries within a multi-tenant provider network environment. By generating and indexing embeddings of logical text passages, the system enables rapid and precise retrieval of information relevant to user queries. This approach reduces the computational load and time required to identify pertinent information across a vast repository of documents, as embeddings offer a compact yet comprehensive representation of text passages for similarity comparisons.

The utilization of logical text passages, which are coherent and self-contained portions of the documents, improves the retrieval-augmented generation process. These passages encapsulate distinct ideas or concepts within a document. This coherence and self-containment ensure that each passage, when retrieved, provides a complete and contextually relevant piece of information that can directly inform or answer aspects of a user query. When such passages are input into an embedding generator and subsequently indexed, the system creates a highly efficient mechanism for matching queries with the most relevant information.

This structured approach to information retrieval significantly enhances the quality of the data fed into the large language model for generating responses. Since the passages are logically coherent, the model is prompted with contextually rich and focused information, minimizing the risk of generating off-topic or irrelevant responses. Moreover, because these passages are self-contained, they provide enough context to the model to generate meaningful and informative responses without requiring additional context or clarification. This method not only streamlines the retrieval process but also ensures that the augmentations used for generating responses are of high relevance and quality, thereby improving the overall effectiveness and efficiency of the retrieval-augmented generation process.

FIG. 1 illustrates an example system and method for logical text passage generation and retrieval for retrieval-augmented generation. Steps of the method are depicted by directed arrows overlaid with numbered circles. The direction of the arrows represents a direction of data flow but not necessarily the exclusive direction. The numbers in the overlaid circles are for reference purposes in this detailed description and are not intended to imply a strict ordering of the steps. Unless the context clearly indicates otherwise, steps may be performed in an order that is different than the order implied by the numbers. Likewise, steps may be performed concurrently, including in parallel, unless the context clearly indicates otherwise.

The method is implemented within a multi-tenant provider network environment 100 that includes a multi-tenant provider network 105, an intermediate network 110, and a client 115 that is used by a user 120. The method involves processing markup language documents to facilitate user-agent interactions.

Initially, the method inputs (Step 1) a set of markup language documents 125 into a logical text passage generator 130 within the multi-tenant provider network 105. This local text passage generator 130 creates (Step 2) logical text passages 135 from the documents 125, which are then input (Step 3) into an embedding generator 140 to produce (Step 4) embeddings 145 for these passages 135. These embeddings 145 are indexed (Step 5) in an embedding index 150.

When a dialog manager 155 receives (Step 6) a user utterance from a user-agent conversation, it inputs (Step 7) a user query—based on the utterance—into the embedding generator 140 to get (Step 8) a corresponding embedding. This embedding is used to query (Step 9) the embedding index 150, identifying (Step 10) relevant text passages. Dialog manager 155 then prompts (Step 11) a large language model 160 with these passages, receives (Step 12) a completion, and sends (Step 13) a response to the user utterance based on this completion.

Returning to the top of FIG. 1, the method is performed in the context of a multi-tenant provider network environment 100. The multi-tenant provider network environment 100 is designed to handle interactions and data processing tasks for multiple clients or tenants within the same infrastructure. This environment 100 encompasses a provider network 105 that facilitates a series of functions, including the generation of logical text passages from markup language documents, the creation of embeddings for these passages, and the indexing of these embeddings for efficient retrieval. This environment 100 supports dialog manager 155 that handles user queries by leveraging the indexed data to generate relevant responses through a large language model 160.

The multi-tenancy aspect of this network 105 allows for the scalable and secure processing of data from different clients (e.g., client 115), ensuring that each tenant's operations are isolated and that their data integrity is maintained. This setup is useful for providing AI-driven services, such as conversational AI and advanced data retrieval systems, where the ability to efficiently process and respond to user queries with high accuracy and relevance is useful.

The intermediate network 110 facilitates communication between the multi-tenant provider network 105, the clients, and potentially other networks or services. This intermediate network 110 acts as a bridge or conduit for data transmission, ensuring that requests from clients, such as user utterances or queries, are securely and efficiently routed to the provider network 105's infrastructure for processing. Additionally, the intermediate network 110 serves to relay responses generated by the provider network 105 back to the relevant clients.

The intermediate network 110 serves as a link between the clients and the multi-tenant provider network 105, and this intermediate network 110 can be the Internet or any other suitable network that meets the requirements of secure and efficient data transmission. Alternatively, the intermediate network 110 could be a specialized network, such as a private cloud infrastructure or a dedicated data communication network, designed to offer enhanced security, lower latency, or other specific advantages tailored to the needs of the multi-tenant provider network 105 and its clients. The choice of the Internet or another suitable network as the intermediate layer 110 depends on the balance between accessibility, performance, security, and cost, aiming to optimize the service delivery and user experience in the context of the provider's operational and strategic objectives.

The method involves processing the set of markup language documents 125 through a series of computational steps. This set of documents 125 can encompass a wide array of online content types. Specifically, the documents 125 can include provider network documentation, which offers technical details and operational guidelines for using the network 105's services; knowledge center articles, which provide insights and solutions for common issues; provider network marketing pages, which aim to inform and attract potential customers by highlighting service features and benefits; reports, which may contain analytical data, performance assessments, or research findings relevant to the network or its services; community articles and posts, offering user-generated content that shares experiences, tips, or advice; blogs, which provide more informal or editorial content related to the provider's industry or technological trends; and tutorials, which offer step-by-step guidance on performing specific tasks or using services.

As used herein, a "markup language document" is a type of data file or data that uses tags to define elements within the document. These tags instruct how text and other elements within the document should be structured, displayed, and processed. The most well-known examples of markup languages are HTML (Hypertext Markup Language) and XML (extensible Markup Language). HTML is predominantly used for creating and designing web pages, allowing for the incorporation of text, links, images, and other multimedia elements in a structured format that web browsers can interpret and display. XML is used for storing and transporting data, providing a flexible way to create information formats and electronically share structured data via the public Internet, as well as via corporate networks. Markup language documents are characterized by their readability both by humans and machines, making them a useful component in web development, data interchange, and the broader field of information technology. These documents can structure content in a hierarchical manner, which allows for efficient data parsing, indexing, and manipulation by various software applications and services.

At Step 1, the set of markup language documents 125 are input into the logical text passage generator 130 within the multi-tenant provider network 105. The logical text passage generator 130 functions to analyze these documents 125 and extract (Step 2) coherent, self-contained text passages 135 from them. In this phase the raw, structured data of the markup language documents 125 is transformed into a more refined form suitable for further processing.

Inputting the set of documents 125 into the logical text passage generator 130 can be accomplished through various methods. One approach is through batch processing, where large collections of the markup language documents are uploaded and processed in bulk. This method is efficient for initializing the system with a substantial base of knowledge or for periodic updates with newly accumulated documents. Additionally, or alternatively, the documents can be streamed into the generator 130 in real-time or near-real-time, allowing for dynamic updating of the system's knowledge base as new content becomes available. This approach is useful in environments where information changes frequently, ensuring the system remains up to date with the latest information.

Another method involves using APIs (Application Programming Interfaces) that automate the retrieval and input of documents from various sources, such as content management systems, web pages, or databases. This method facilitates a more integrated and automated workflow, enabling continuous synchronization between the source content and the logical text passage generator 130. Additionally, manual uploads can be utilized for targeted updates, especially in cases where specific documents need to be prioritized or reviewed before inclusion.

For environments that require high levels of customization or selective processing, documents might be pre-processed or filtered based on certain criteria (e.g., relevance, freshness, or authority) before being input into generator 130. This pre-selection process ensures that only the most pertinent and valuable documents are considered, optimizing the efficiency and effectiveness of the text passage generation process.

At Step 2, the set of logical text passages 135 are generated from a collection of markup language documents 125 by the logical text passage generator 130. This involves analyzing and breaking down the input documents 125—comprised of varied types of content encoded in markup languages such as HTML or XML—into coherent and self-contained text passages. The logical text passage generator 130 employs algorithms or models capable of understanding the structure and semantics of the input documents 125 to identify and extract segments that stand alone in meaning and context. This includes in an embodiment parsing the documents 125 to remove or interpret markup tags, identifying headings and subheadings to delineate sections, or employing natural language processing techniques to understand textual content and its logical divisions. Techniques employed by the logical text passage generator 130 for generating the logical text passages 135 from the set of markup language documents 125 are described in greater detail elsewhere in this detailed description.

The logical text passage generator 130 is a component within the multi-tenant provider network 105 that processes markup language documents 125 to generate logical text passages 135. In an embodiment, this generator 130 can encompass various forms of artificial intelligence, including neural networks, to perform its tasks. Specifically, a convolutional neural network (CNN), which is well-suited for analyzing visual data, can be trained to segment images of markup language documents 125 into discrete, logical text passages.

The integration of a CNN into the logical text passage generator 130 enables the system to handle documents not only as text files but also as images. The CNN can be trained on a dataset comprising images of markup language documents annotated with the locations and extents of logical text passages. Through its training, the CNN learns to identify patterns and structures characteristic of markup language documents, such as HTML tags, layout features, and textual content, directly from the image data.

Once trained, the CNN can analyze new images of markup language documents 125, accurately segmenting them into logical text passages 135. These passages are then extracted and converted into a text format suitable for further processing by the system, including embedding generation and indexing. This approach allows the system to leverage visual cues for text extraction, enhancing its ability to deal with a wide range of document formats and layouts.

The logical text passage generator 130's role within the multi-tenant provider network 105 is to transform markup language documents 125 or their markdown versions into logical text passages 135. In an embodiment, this transformation can be achieved using a large language model (LLM). Large language models can be applied to the task of segmenting markup language documents into discrete, coherent text passages.

The process begins by prompting the large language model with the content of markup language documents or markdown versions thereof. These prompts are designed to instruct the LLM to identify and delineate logical sections within the documents. The language model, leveraging its vast training on diverse text corpora, including potentially markup languages and structured documents, discerns the inherent structure of the input documents. It recognizes headers, paragraphs, lists, and other semantic elements that constitute logical segments of text within the documents.

Through this process, the large language model generates outputs that effectively segment the original documents 125 into logical text passages 135. Each passage represents a cohesive block of content that has been identified based on the document's semantic and structural cues as interpreted by the LLM. This method capitalizes on the LLM's deep understanding of language and structure, enabling it to process documents in a way that mirrors human-like comprehension. The resultant logical text passages 135 are then suitable for further processing within the multi-tenant provider network 105, such as embedding generation and indexing.

Following the generation of logical text passages from markup language documents, Step 3 involves inputting these passages 135 into the embedding generator 140 within the multi-tenant provider network 105. This step transitions the process from text analysis to the creation of numerical representations known as embeddings. Embedding generator 140 uses algorithms, rooted in machine learning and natural language processing, to convert the textual content of each passage into a high-dimensional vector space. These embeddings 145 capture not just the superficial elements of the text, but also the deeper semantic meanings, relationships, and nuances contained within passages 135.

The transformation of textual passages 135 into the embeddings 145 enables the system to perform sophisticated and semantically aware operations on the text, such as similarity searches. This is because the embeddings 145 can represent the meaning of the text 135 in a format that machines can efficiently process and compare. Secondly, by converting the passages 135 into a uniform, machine-readable format, the system can more accurately index, retrieve, and utilize these passages 135 in response to user queries.

At Step 4, the embedding generator 140 creates the set of logical text passage embeddings 145 from the set of logical text passages 135. This stage involves applying sophisticated machine learning algorithms, particularly those specialized in natural language processing (NLP), to transform the previously identified and segmented logical text passages 135 into dense vector representations 145, known as embeddings. These embeddings 145 are high-dimensional and designed to capture the nuanced semantic and contextual meanings embedded within the text passages.

The generation of embeddings 145 facilitates a more efficient and effective means of comparing and retrieving text passages 135 based on semantic similarity rather than mere keyword matching. This is because embeddings 145 can encapsulate the essence of a passage's meaning in a way that is computationally accessible for similarity calculations and other forms of machine learning tasks. Secondly, by converting textual information into a consistent and analyzable format, the system is better positioned to leverage the wealth of information contained within the multi-tenant provider network 105's documentation and resources. This enhances network 105's ability to provide relevant, context-aware responses to user queries. The embeddings 145 enable a deeper level of interaction between the user's input and the information stored within the network 105, allowing for a more dynamic and intelligent dialog management process that can accurately interpret and respond to the user's needs based on the semantic content of the network's resources.

In an embodiment, generating the set of logical text passage embeddings 145 at Step 4 involves the embedding generator 140 using a transformers model 165 such as, for example, MPNet. This process leverages model 165's understanding of language syntax and semantics to create high-dimensional vector representations of text passages. MPNet, short for Masked and Permuted Pre-training for Language Understanding, is adept at understanding context and the relationships between words in a passage due to its pre-training strategies that combine elements of both masked language modeling and permuted language modeling. When logical text passages 135 are input into the transformer model 165, it analyzes the passages' content, considering the context provided by the surrounding text and the inherent meaning of individual words and phrases. The model 165 then processes this information through its layers of neural networks, each designed to capture different aspects of language understanding, from basic syntactical structures to complex semantic relationships. The output is the set of embeddings 145, which are dense vector representations capturing the nuanced features of each text passage. These embeddings 145 can be used for various downstream tasks such as similarity comparison, clustering, or as part of a larger system for information retrieval, where they serve as a basis for efficiently matching queries to relevant documents by comparing the geometric relationships between vectors in the embedding space.

While MPNet is an example of the transformer model 165 capable of generating logical text passage embeddings 145, a variety of alternatives can be employed for this purpose. For instance, a BERT (Bidirectional Encoder Representations from Transformers) model can be used as transformer model 165. A BERT model understands the context of words in text by processing it in both directions (left-to-right and right-to-left), making it effective for generating nuanced embeddings. A GPT (Generative Pretrained Transformer) model can be used as transformer model 165. A GPT model has generative capabilities that can also be adapted to produce embeddings that capture deep semantic meanings. A ROBERTa (Robustly Optimized BERT Approach) model can be used as transformer model 165. A ROBERTa model further refines BERT's approach with more extensive pre-training and optimization. A DistilBERT model can be used as transformer model 16. A DistilBERT model offers a lighter, faster alternative that retains most of the original BERT model's effectiveness but is more efficient in terms of computational resources. Each of these models operates on the foundational principles of the transformer architecture but is designed with specific optimizations or training strategies to enhance performance on types of language processing tasks. This flexibility allows for the selection of the most appropriate transformer model 165 based on the specific requirements of the task at hand, whether that be the complexity of the text, the need for computational efficiency, or the level of semantic understanding required.

At Step 5, the set of logical text passages 135 are indexed by their corresponding embeddings 145 in an embedding index 150 within the multi-tenant provider network 105. Once the embedding generator 140 has transformed the logical text passages 135 into their embedding representations 145, these embeddings 145 are stored in a specialized database known as an embedding index 150. This index 150 is designed to handle high-dimensional vector data, enabling rapid and efficient similarity searches among the embeddings.

Indexing the embeddings 145 instead of the raw text or simpler representations allows for a more nuanced and semantically rich search capability. When a query is received, its generated embedding can be compared against the indexed embeddings to find the most semantically similar passages, rather than relying solely on keyword matches which might miss contextually relevant but lexically distinct information. This process leverages the embeddings' ability to capture the deep semantic meaning of texts, making it possible to surface information that is contextually related to the user's query even if the exact words are not shared.

The embedding index 150 facilitates efficient and accurate retrieval of logical text passages relevant to a user query. This index 150 can be part of a nearest neighbors embedding search engine 170, which is designed to find the closest embeddings in the vector space to a given query embedding. When logical text passage embeddings 145 are generated and stored in the embedding index 150, they are effectively mapped into a high-dimensional vector space where the semantic similarity between passages is reflected in their proximity to one another. Upon receiving a user query, the dialog manager 155 inputs this query into embedding generator 140 to produce a query embedding. This embedding is then used to query the embedding index 150 within the nearest neighbors search engine framework. The engine 170 quickly sifts through the vast collection of stored embeddings 145 to identify those that are most similar—or nearest in terms of distance metrics such as cosine similarity or Euclidean distance—to the query embedding. This process leverages indexing structures and algorithms optimized for high-dimensional data, ensuring that the search is both fast and scalable, even in the context of large datasets common in multi-tenant provider networks. By integrating the embedding index 150 into the nearest neighbors embedding search engine 170, the system achieves the dual objectives of maintaining high accuracy in understanding and responding to user queries while also ensuring the responsiveness necessary for real-time or near-real-time applications. This setup enables dialog manager 155 to effectively identify and retrieve the most relevant logical text passages that can then be used to generate informed and contextually appropriate responses to users' inquiries or commands.

Steps 1-5 can be performed before Steps 6-13. For example, embeddings 145 may be indexed in embedding index 150 before the client 115 connects to the multi-tenant provider network 105 to start a user-agent conversation during which user utterances are received by the dialog manager 155.

At Step 6, a user utterance is received at dialog manager 155 within the multi-tenant provider network 105. This step involves dialog manager 155 capturing and processing the user's spoken or typed input, which is referred to as a user utterance. This utterance is part of a user-agent conversation, an interactive exchange where the user is seeking information, assistance, or action from the system.

The reception of a user utterance triggers a sequence of operations designed to understand and respond to the user's request accurately. The dialog manager 155's role acts as the interface between the user and the complex backend processes. Upon receiving the utterance, the dialog manager 155 analyzes it to extract the user's intent and contextual cues.

This step of receiving and understanding the user utterance sets the stage for the subsequent processing stages, including the generation of a user query from the utterance, querying the embedding index for relevant text passages, and eventually formulating a response based on the large language model's completion.

The user-agent conversation can be envisaged as a generative artificial intelligence (AI) chat conversation, leveraging the sophisticated capabilities of the large language model 160 to engage in dynamic, context-aware dialogues with users. This interaction begins when a user inputs an utterance, which the dialog manager 155 within the multi-tenant provider network 105 receives and processes. By translating this user utterance into a query, generating embeddings, and retrieving relevant logical text passages from an indexed database, the system ensures that the foundation for generating responses is deeply rooted in contextual understanding and relevance.

The large language model 160, prompted with these relevant text passages, employs its extensive training on diverse datasets to generate a completion that is not only coherent and contextually appropriate but also tailored to the nuances of the conversation. This generative process involves the model synthesizing information, reasoning, and even simulating empathy or personality as required by the context of the conversation. The result is a response that is sent back to the user, which can range from answering queries, offering advice, to engaging in complex discussions, thereby embodying a generative AI chat conversation.

At Step 7, the dialog manager inputs a user query into the embedding generator 140, derived from the user's utterance or based on it. The user utterance, initially received by dialog manager 155, serves as the foundation for generating a user query. This query encapsulation may involve refining or expanding the user's original utterance into a format that is optimized for the subsequent search and retrieval process.

The embedding generator 140, upon receiving this query, transforms it into a dense vector representation, known as an embedding. This representation captures the semantic essence of the query, enabling the system to understand the query's context and nuances beyond mere keyword matching. The embedding process is fundamental to the system's ability to connect the user's query with the most relevant information contained within the indexed logical text passages. By converting both the user query and the stored text passages into a compatible embedding space, the system facilitates a more nuanced and effective matching process.

At Step 8, the generation of a logical text passage embedding from the user query by the embedding generator 140 involves translating the user query, which may be a complex expression of needs or questions, into a high-dimensional vector space. The embedding generator accomplishes this by analyzing the query's linguistic patterns, key terms, and semantic context, then mapping these elements into an embedding that captures the essence of the query in a dense, machine-readable format.

This embedding process enables the system to understand and process the user's request in a computationally efficient manner. By converting text into vectors, the system can perform arithmetic operations on these embeddings to measure similarities, differences, and relationships between the user's query and the indexed logical text passages. Second, it allows for a level of abstraction that keyword-based searches cannot achieve, enabling the identification of relevant passages that may not explicitly contain the query's keywords but are contextually related. Finally, this embedding facilitates a more nuanced and effective retrieval process, as the dialog manager 155 can use this vector to query the embedding index 150, thereby identifying the most relevant logical text passages to the user's query.

At Step 9, the querying of the embedding index 150 by the dialog manager 155 using the logical text passage embedding represents a step in aligning user inquiries with the most relevant informational content. The dialog manager 155 leverages the embedding generated from a user's query to search the embedding index 150. This index is a structured repository where logical text passages 135 are cataloged according to their embeddings 145, which serve as unique, high-dimensional fingerprints encapsulating their semantic essence.

The querying operation is, in an embodiment, a search for the nearest neighbors in the embedding space, where the "distance" between the query embedding and the embeddings of stored passages indicates relevance. The closer two embeddings are, the more relevant the corresponding text passage is likely to be to the user's query. This method surpasses traditional keyword-based searches by focusing on the context and semantic meaning, allowing for the retrieval of content that is not only textually similar but contextually appropriate.

At Step 10, the dialog manager receives a set of one or more logical text passages, identified in the embedding index 150 as being relevant to the user query. After querying the embedding index 150 with the embedding generated from a user's query, the dialog manager 155 is presented with a selection of logical text passages that have been algorithmically determined to closely match the semantic content of the query. These passages, drawn from a comprehensive collection of markup language documents 125, have been previously processed into discrete, semantically rich embeddings 145. The retrieval of these passages is made possible by comparing the similarity of embeddings, a method that transcends mere keyword matching to consider the deeper meaning and context of the user's request.

This receipt of relevant logical text passages enables the dialog manager 155 to proceed with a nuanced and informed selection of content that is most likely to answer the user's inquiry effectively. The identified passages serve as the elements upon which the dialog manager 155 can construct responses that are not only accurate but also contextually enriched, thereby enhancing the user's experience and engagement with the provider network's conversational agent system.

In an embodiment, the identified text passages are ranked according to their respective relevance to the user query. This ranking process relies on the similarity measures between the embedding of the user query and the embeddings of each of the logical text passages stored in the embedding index. Embeddings represent the semantic content of text in a high-dimensional space, where the distance or angle between vectors can be interpreted as a measure of semantic similarity or relevance.

After the dialog manager 155 inputs the user query embedding into the embedding generator 140 and queries the embedding index 150, it retrieves a list of candidate passages whose embeddings have the highest similarity scores to the query embedding. These scores are then used to rank the passages, with those having embeddings most similar to the query embedding (indicating higher relevance) being ranked higher. This ranking allows the system to prioritize the passages that are most likely to be relevant to the user's intent, providing a basis for generating more accurate and contextually appropriate responses.

The system can then use this ranked list of passages to inform the next steps in the process. When prompting the large language model 160 with passages relevant to the user query, the dialog manager 155 can prioritize or even limit its prompt to include only the top-ranked (e.g., the top-N) passages. This ensures that the information most likely to be pertinent to the user's query is considered in generating the completion, which ultimately forms the basis of the response sent to the user. This method of ranking and selecting passages enhances the efficiency and relevance of the multi-tenant provider network 105's conversational agent responses, improving user satisfaction and engagement.

In an embodiment where the number of the set of relevant text passages is greater than the number of those text passages that are included in the prompt of the LLM, the relevance of metadata associated with the relevant logical text passages is incorporated into the ranking process. Metadata, in this context, may include various descriptors such as the titles, headers, dates (e.g., last edited dates), or other categorization elements of the markup language documents from which these passages were extracted. This metadata provides additional contextual information that can significantly enhance the process of determining the relevance of text passages to a user query.

When the dialog manager receives 155 a set of logical text passages identified as relevant to the user query, it initially ranks these passages based on the similarity of their embeddings to the query embedding. To further refine this ranking, the system then evaluates the relevance of the associated metadata to the user query. For instance, if the metadata includes the title or headers of a document, the system assesses how closely these titles or headers relate to the user's intent as expressed in the query. This assessment could be based on keyword matching, semantic similarity evaluations, or other natural language processing techniques designed to understand the context and meaning of text.

The reranking process involves adjusting the initial rankings of the text passages based on this additional layer of relevance. Passages whose metadata closely aligns with the user query may be ranked higher than those with less relevant metadata, even if the initial embedding-based similarity scores were comparable. This approach acknowledges that two passages of similar content relevance might differ in their actual utility or appropriateness to the query based on the broader context or subject matter indicated by their metadata. Additionally, or alternatively, passages may be reranked based on recency (e.g., last edited date or publication date) such that text passages obtained from more recent markup language documents are or tend to be ranked higher than text passages obtained from less recent markup language documents.

Incorporating metadata into the reranking process allows for a more nuanced and context-aware selection of a top number (e.g., top-N) of relevant text passages, enhancing the system's ability to provide responses that are not only relevant but also contextually fitting. This could lead to a more satisfying user experience, as responses would be more likely to align with the user's expectations and the specific nuances of their query. By leveraging both the semantic content of text passages and the contextual cues provided by metadata, the system can achieve a higher level of precision and relevance in its conversational responses.

At Step 11, the large language model (LLM) 160 is prompted by the dialog manager 155 with a prompt that includes the set of one or more logical text passages relevant to the user query. This process leverages the work of identifying relevant text passages from an extensive corpus of markup language documents, which have been indexed and made retrievable through semantic embeddings.

This prompting mechanism is designed to make the most of the LLM 160's capabilities in understanding context, generating coherent responses, and providing information that is directly relevant to the user's initial query. The inclusion of specific, relevant text passages in the prompt ensures that the model 160's response is grounded in the same context as the user's request, thereby increasing the accuracy and relevance of the information provided.

At step 12, a completion to the prompt generated by the large language model (LLM) 160 is received by the dialog manager 155. This step marks the culmination of a pipeline that integrates logical text passages with advanced AI capabilities to produce contextually relevant responses to user queries. After the dialog manager 155 prompts the LLM 160 with selected logical text passages that are pertinent to the user's query, the LLM 160 processes this information to generate a tailored response. This response is a nuanced, context-aware completion that addresses the user's query in an informative and coherent manner.

The reception of this completion by the dialog manager 155 signifies that the AI has successfully leveraged the provided context to enhance its understanding and response accuracy. This step embodies the AI's ability to synthesize and extrapolate from specific information to produce answers that can effectively mimic human-like interaction patterns. For the user, this translates into receiving detailed, accurate, and contextually relevant information in response to their inquiries, thus significantly enhancing the user experience. The integration of logical text passages with the generative capabilities of the LLM 160 encompasses a powerful use case of AI in improving conversational agents' effectiveness, particularly in environments that require handling complex information and engaging users in meaningful dialogues.

The large language model (LLM) 160 generates responses based on the relevant text passages identified from a user query. Suitable LLMs for this application are models that excel in understanding context, generating human-like text, and integrating information from diverse text passages into coherent and relevant responses. Examples of such models include GPT (Generative Pre-trained Transformer) models, such as GPT-3 or its successors. BERT (Bidirectional Encoder Representations from Transformers) and its derivatives, although originally designed for understanding context in text, can also be adapted for generative tasks through fine-tuning. T5 (Text-to-Text Transfer Transformer) is another versatile model that can convert text-based inputs into meaningful text outputs, making it suitable for generating responses based on prompts that include relevant text passages.

At Step 13, the dialog manager 155 sends a response to the user's utterance, which either comprises the completion received from the large language model (LLM) 160 or is generated based on it. This step represents the culmination of a complex, multi-stage process of understanding, generating, and delivering information tailored to the user's specific needs. After receiving the completion generated by the LLM 160, the dialog manager 155 evaluates and possibly refines this output to ensure it meets the required standards of relevance, coherence, and informativeness before forwarding it as a response to the user. This mechanism ensures that the user's interaction with the system is not just a passive receipt of information but an engaging dialogue that can provide precise answers, recommendations, or actions based on a deep understanding of the user's query as contextualized by the logical text passages.

Figure 2:
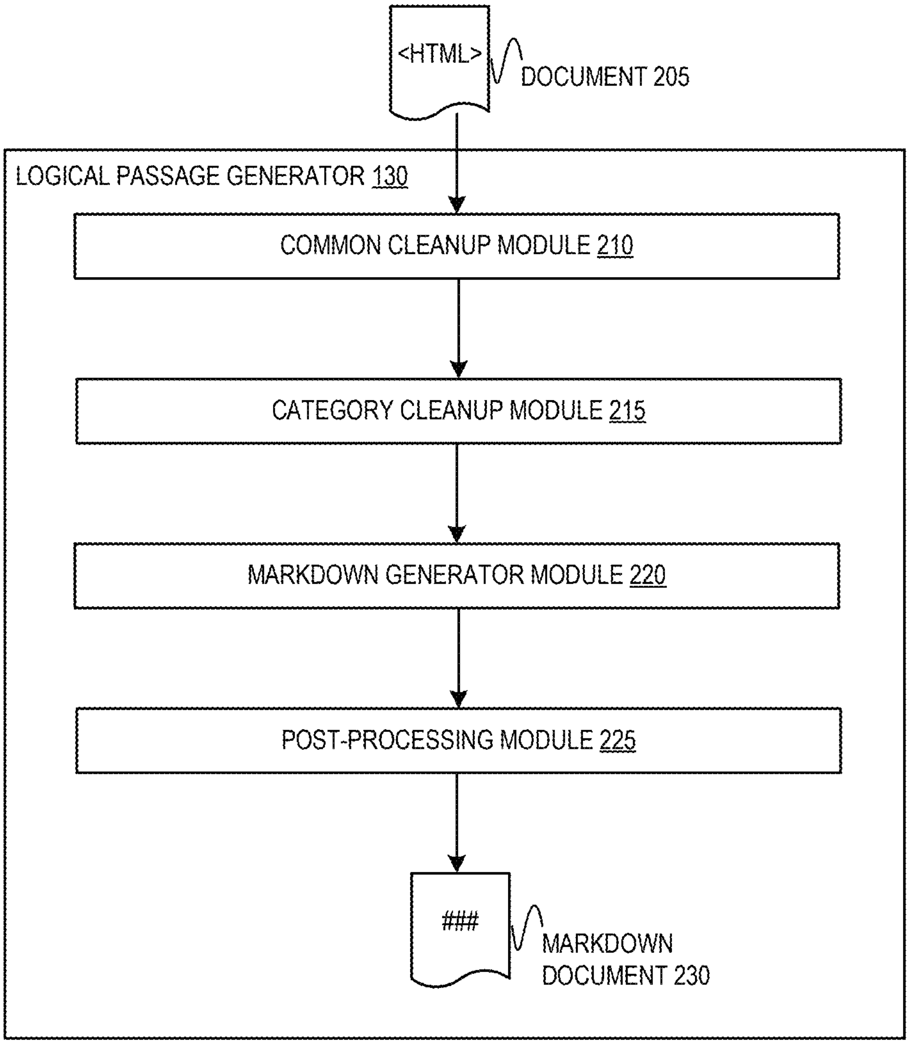
FIG. 2 illustrates modules of the logical passage generator that perform respective functions for generating a set of one or more logical text passages from an input markup language document.

FIG. 2 illustrates some modules of the logical passage generator 130 that perform respective functions for generating a set of one or more logical text passages from an input markup language document 205. The logical passage generator 130 includes a common cleanup module 215, a category cleanup module 215, a markdown generator module 220, and a post-processing module 225. The result of processing the input document 215 is a markdown document 230.

In the context of the logical passage generator 130, the common cleanup module 210 preprocesses markup language documents before they are transformed into logical text passages. This module 210 is designed to refine the input documents by eliminating markup language elements that do not contribute to the meaningful content needed for generating logical text passages. For example, in an embodiment, the BeautifulSoup library is utilized and the html.parser thereof is employed by module 210 to effectively parse the markup language content to facilitate the identification and removal of non-essential elements.

In an embodiment, the cleanup process targets specific HTML tags such as "button", "form", "label", "input", "script", and various "a" tags that lead to JavaScript functions or anchor points within the same page, which are irrelevant for the generation of logical text passages. Additionally, the common cleanup module 210 removes "div" tags styled to be invisible (display: none) or classified as non-contributory (class: none), as well as "img" tags lacking a source attribute and "noscript" elements. This initial general cleanup ensures that the content fed into the logical text passage generator 130 is devoid of clutter that could hinder the accurate generation of text passages.

By stripping these elements, the common cleanup module 210 ensures that the subsequent steps of generating logical text passages, embeddings, and ultimately, the dialogue responses are based on the substantive content of the documents.

The category cleanup module 215 within the logical text passage generator 130 takes a specialized approach to refining the input markup language documents, tailored to their specific content categories. This module 215's task involves performing an additional layer of cleanup that focuses on extracting the main content tags relevant to each document's category, recognizing that different types of documents structure their meaningful content in various HTML tags and attributes.

For document categories such as Docs, Blogs, Tutorials, and Events (with subcategories On-Demand and Virtual Workshop), module 215 identifies and extracts content from specific HTML tags and attributes designated as containing the main content. For example, it looks for "div" tags with an "id" of "main-content" for Docs, "main" tags with an "id" of "page-content-main" for Blogs, and so on. This targeted extraction ensures that only the core content, which is most relevant for generating logical text passages, is selected, while extraneous sections like headers, footers, and side panels that do not contribute to the meaning of the chunk are ignored.

By focusing on the main content tags, the category cleanup module 215 effectively filters out unrelated and non-essential content, preparing the documents for the subsequent generation of logical text passages and embeddings.

The markdown generator module 220 converts the main HTML content into Markdown format. In an embodiment, this conversion is executed using the markdownify library, with the heading style set to ATX. A motivation behind this conversion process is to leverage Markdown's inherently simpler syntax and clear content separators, which significantly facilitates the subsequent chunking of content into logical text passages.

Markdown, known for its plain text formatting syntax, offers a more straightforward and readable structure compared to HTML, which can be cluttered with tags and attributes. By transforming HTML content into Markdown, module 220 ensures that the document's structure is preserved while eliminating the complexities associated with HTML parsing. The ATX heading style, characterized by using hash marks (#) for headings, further aids in delineating sections of the text clearly, making it easier to identify and extract discrete passages of text.

By providing well-defined separations and a cleaner, more manageable format, the markdown generator module 220 enhances the system's ability to process and understand the content.

The post-processing module 225 refines the Markdown content to ensure a consistent and manageable content template suitable for subsequent operations. module 225 undertakes several tasks to enhance the usability and coherence of the converted Markdown content, making it more amenable to chunking and analysis.

Firstly, module 225 strips any extra preceding or trailing spaces from the Markdown content. This step is crucial for maintaining a clean and uniform format, eliminating irregular whitespace that could interfere with the processing and interpretation of the text.

Secondly, it replaces the code block separators with a custom separator. This allows the system to correctly identify and preserve code blocks within the chunks while excluding them from the chunk size calculation. This adjustment addresses a specific challenge where embedding code blocks is problematic, ensuring that only plain text—devoid of code blocks—is considered for embedding. This distinction is useful for accurately generating embeddings that represent the textual content without the potential noise introduced by code blocks.

The replacement of non-breaking spaces with regular spaces in the markdown content further standardizes the text, ensuring uniformity in whitespace usage. Similarly, converting ordered lists to unordered lists simplifies the structure of the content. Numbered items in ordered lists can disrupt the chunking process due to their variable lengths and the difficulty of splitting based on numbered separators. This change to unordered lists avoids such complications, allowing for smoother segmentation of the content.

Lastly, module 225 addresses excessive use of "\n" (line breaks) within paragraphs by replacing them with plain spaces. This adjustment is useful for preserving the semantic integrity of paragraphs while eliminating unnecessary line breaks that could fragment the text unnecessarily. By ensuring paragraphs are presented as continuous blocks of text, the system can more effectively interpret and chunk the content based on semantic units rather than arbitrary line breaks.

These post-processing steps collectively ensure that the Markdown content 230 is in a uniform, clean format that facilitates the logical segmentation into text passages.

Figure 3:
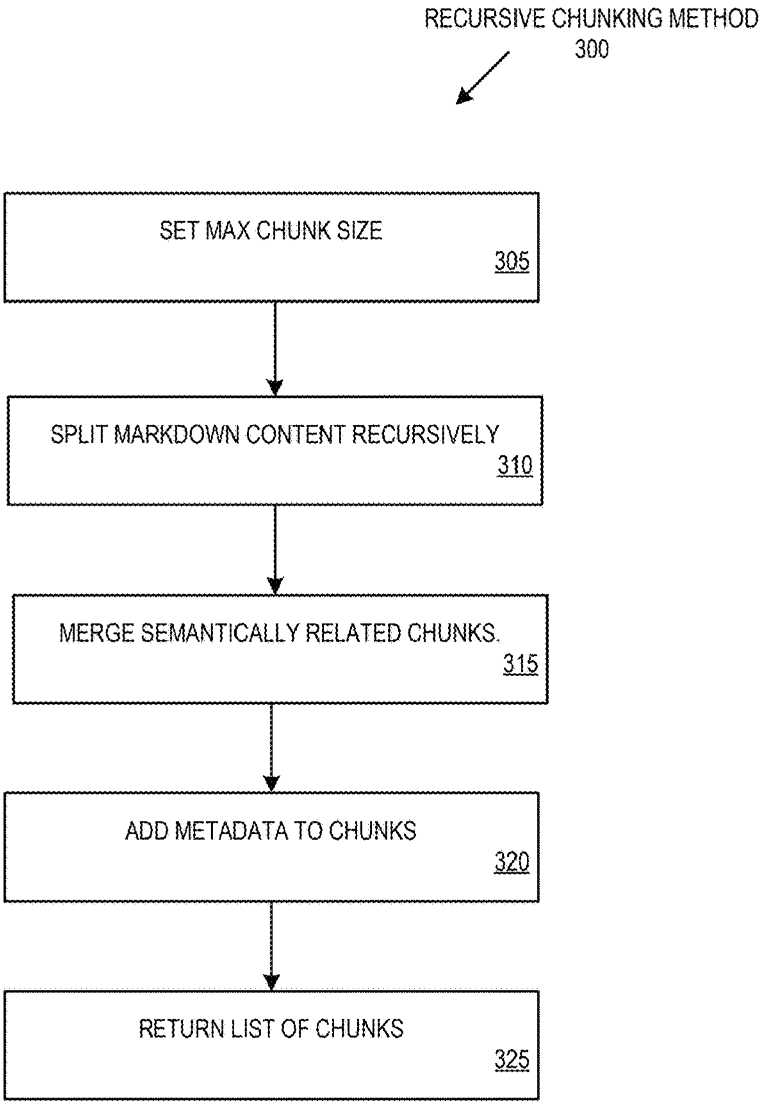
FIG. 3 illustrates a flowchart of a method performed by a logical passage generator for recursively splitting Markdown content generated for a markup language document by the logical passage generator into a list of chunks.

FIG. 3 illustrates a flowchart of a method 300 performed by the logical passage generator 130 for recursively splitting the Markdown content 230 generated for a markup language document 205 by the logical passage generator 130 into a list of chunks.

Initially, the method 300 sets 305 a maximum chunk size. This step influences the subsequent operations within the logical text passage generator 130, ensuring that the content is segmented into manageable units that are compatible with the capabilities of the embedding generator 140. In an embodiment, the chunk size is set to 2000 characters. This specific size constraint is determined based on the token size limit of the embedding generator 140 used within the multi-tenant provider network 105.

In an embodiment, the rationale behind setting a chunk size of 2000 characters is grounded in the operational parameters of the embedding generator 140, which has a maximum token capacity of 500 tokens. Given that each token of the embedding generator 140 approximately corresponds to 4 characters, the maximum chunk size is calculated to be 500 tokens*4 characters/token=2000 characters. This calculation ensures that each chunk of text processed and generated by the logical text passage generator 130 can be efficiently handled by the embedding generator without exceeding its tokenization capacity.

The step of recursively splitting 310 markdown content into chunks is designed to methodically break down the text into smaller, manageable pieces. This is aimed at transforming the input set of markup language documents into a structured set of logical text passages. The objective here is to ensure that each chunk is semantically coherent and aligns with the predefined maximum chunk size, thus preparing the text for efficient embedding and subsequent retrieval in response to user queries.

The splitting process follows a hierarchical approach based on common markdown separators. Following this hierarchical order maintains the semantic structure and logical flow of the content. The process begins with the highest level of markdown structure, the headers, starting from level 2 headings (e.g., "In ##") and proceeding to the finer elements of the markdown syntax. By prioritizing headers, the method ensures that each chunk maintains a clear thematic focus, reflecting the original document's structure.

Following headers, the method progresses through a predefined sequence of markdown separators: unordered lists, code blocks (using a custom separator to facilitate embedding), horizontal lines, paragraphs, single lines, and finally, individual spaces and letters for exceptionally long words or paragraphs. This sequence is designed to gradually break the content into smaller parts, only moving to a finer level of granularity when larger segments exceed the maximum chunk size or cannot be semantically divided at the current level.

The use of a custom code block separator (e.g., "\n<!!code!!>") is a notable adaptation to address embedding challenges, ensuring that code blocks are treated distinctly during the chunking process. In an embodiment, code blocks are omitted from text passages so that the code blocks are not considered by the embedding generator 140 when generating the embeddings 145.

This recursive splitting process generates logical text passages that are not only sized appropriately for the embedding generator 140's constraints but also retain their intrinsic meaning and structure. By methodically deconstructing the markdown content in this manner, the logical text passage generator 130 facilitates the creation of a structured and semantically rich dataset. These chunks are then further processed, embedded, and indexed, ultimately enabling the dialog manager 155 to retrieve relevant content efficiently in response to user queries within the multi-tenant provider network environment 100.

The step of recursively splitting 310 markdown content into chunks is a process within the workflow of generating logical text passages 135 from a set of markup language documents 125. This step is designed to ensure that the content is segmented into manageable and semantically coherent chunks that conform to a predefined maximum size. The process begins with the entire content being treated as a single chunk. This initial chunk is then assessed against the maximum chunk size limit of 2000 characters, a threshold determined by the token size limit of the embedding generator 140 used later in the process.

If the initial chunk's size is within the 2000-character limit, it is accepted as is, without necessitating further division. However, if the chunk exceeds this limit, the method employs a hierarchy of markdown separators to divide the content further. This hierarchical approach ensures that the content is split in a structured manner, starting from higher-level separators such as markdown headings (beginning with level 2 headings) down to finer separators like spaces and, in rare cases, individual letters, to accommodate exceptionally large words or segments.

This recursive splitting process maintains the semantic integrity of the text by prioritizing the division of content at natural structural boundaries within the markdown document, such as headings and lists, before moving on to more arbitrary splits like spaces or individual letters. Secondly, by ensuring that each chunk is within the maximum size limit, the process guarantees that the logical text passages 135 can be efficiently processed by the embedding generator 140, avoiding issues related to token overflow or incomplete semantic representation in the embeddings 145.

Furthermore, this methodical splitting approach facilitates the generation of logical text passages 135 that are not only size-optimized but also enriched with context and meaning, enabling effective indexing and retrieval based on logical text passage embeddings 145.

The step of merging 315 semantically related chunks is a part of refining the set of logical text passages 135 generated from a set of markup language documents 125. This step is designed to enhance the coherence and meaning of the text chunks created during the recursive splitting process. After the initial segmentation of the markdown content into chunks that adhere to a predefined maximum size, there exists a possibility of having numerous smaller chunks that, while individually adhering to the size constraints, may not convey sufficient meaning or maintain semantic continuity when isolated. This concern is addressed by implementing a custom logic aimed at recombining these “good chunks” to approximate the optimal chunk size of 2000 characters, ensuring that the information remains contextually rich and semantically integrated.

The rationale behind this merging step is twofold. Firstly, it seeks to prevent the fragmentation of semantically connected content into excessively small pieces that might compromise the comprehensiveness and understandability of the information. For instance, a list of items within a document, when split into individual chunks, could result in segments that, on their own, lack the contextual framework provided by the complete list. By merging such items back into larger chunks-up to the vicinity of the 2000-character limit—the integrity and coherence of the list are preserved, thereby maintaining the logical flow of information.

Secondly, this approach serves to optimize the utilization of the embedding generator 140 and the subsequent indexing in the embedding index 150. By ensuring that chunks are not only within a manageable size limit but also contextually enriched through the merging of semantically related content, the system can generate more accurate and meaningful embeddings 145. This facilitates a more efficient and relevant querying process by the dialog manager 155, as the indexed logical text passages 135 are better aligned with potential user queries, thus enhancing the overall effectiveness of the response generation mechanism.

The decision to selectively merge chunks based on specific markdown separators (such as lists, paragraphs, lines, spaces, and, in rare cases, letters) is calculated to maintain structural and semantic coherence. This selection ensures that the merging process respects the natural boundaries of the content, reinforcing the relevance and utility of the logical text passages 135 in supporting the dialog manager 155's operations within the multi-tenant provider network environment 100.

The addition 320 of metadata to chunks enhances the functionality and efficiency of the overall process of generating and utilizing logical text passages within a multi-tenant provider network environment. As detailed, once the logical text passages, or “good chunks,” are finalized through recursive splitting and potential merging to ensure semantic coherence, they are further enriched with specific metadata. This metadata facilitates the reconnection of chunks when necessary and improves the ability of the large language model (LLM) 160 to recognize and understand patterns of chunk similarity and contextual proximity.

The metadata added to each chunk includes identifiers that establish relationships both within and between documents. The “Parent chunk id” and “Child chunk ids” create a hierarchical structure among the chunks, enabling the system to trace back the origin of each chunk to a larger context or to group related chunks, enhancing the logical flow when chunks are used to generate responses. This is particularly useful in cases where splitting has fragmented a document into many parts, as it allows for the potential reassembly of content or the maintenance of narrative continuity in the generated responses.

Similarly, the “Previous Chunk id” and “Next Chunk id” metadata establish a linear sequence among chunks, aiding in the preservation of the document's original narrative flow. This sequential linkage ensures that when chunks are utilized for generating responses to user queries, the dialog manager can maintain a coherent progression of ideas, mirroring the natural structure of the original document.

Additional metadata, such as the “Chunk UUID” and “Chunk Document id,” further refines the system's ability to manage and reference chunks. The Chunk UUID, generated through a SHA256 hash of the chunk content and its URL, provides a unique identifier for each chunk, ensuring that even identical text segments from different parts of a document or different documents altogether can be distinctly recognized and utilized. The Chunk Document id, also generated via a SHA256 hash but of the document URL, ties chunks to their source documents, facilitating document-level analyses or operations, such as tracking changes or updates to the original documents.

This metadata not only enhances the system's operational capabilities by allowing for sophisticated indexing, querying, and retrieval strategies but also significantly contributes to the system's learning and adaptation processes. By encoding relational and contextual information directly into the chunks, the metadata enables the LLM 160 to learn patterns of content organization, semantic relationships, and context-specific usage more effectively, thereby improving the relevance and accuracy of the generated responses.

The culmination of the method 300 is the returning of a finalized list of chunks comprising logical passages. This list represents an organized and structured dataset, where each chunk is a manageable size for further processing, semantically coherent, and enriched with metadata to maintain logical and contextual relationships. This structured dataset is then inputted into embedding generator 140. Embedding generator 140 uses this list to generate a set of logical text passage embeddings, translating the structured text data into a form that can be efficiently indexed, queried, and utilized for generating responses to user queries.

In an embodiment, a specialized chunking approach tailored for FAQ (Frequently Asked Questions) documents is utilized. Unlike the general method of processing markup language documents, which involves recursively splitting content into chunks based on a maximum size and then merging semantically related chunks, the FAQ documents are treated uniquely due to their inherent structure of Question (Q) and Answer (A) pairs. Each FAQ document follows a fixed template where every question is directly followed by its corresponding answer.

Recognizing the semantic importance of keeping each Q and A pair together as a single unit of information, the system implements explicit logic to identify and group each pair as an individual chunk. This approach deviates from the size-based chunking criterion used for other types of content, allowing Q and A pairs to be treated as singular chunks regardless of their length. This is because, semantically, the integrity of each question-answer pair is crucial for understanding and retaining the full context of the information being provided. Each pair, encapsulated as a chunk, ensures that the logical and contextual relationship between the question and its answer is preserved, facilitating the generation of embeddings, indexing, and subsequent retrieval of relevant FAQ content in response to user queries.

In an embodiment, a fallback chunking strategy complements the primary method of processing markup language documents. The primary process involves a detailed approach to generating logical text passages, including setting a maximum chunk size, recursively splitting content into chunks based on markdown structure, merging semantically related chunks, adding metadata, and finally returning a list of chunks for further processing, such as embedding generation and indexing.

The extension introduces a simpler, more straightforward fallback mechanism for chunking content when the primary method may not be applicable or effective. This fallback logic employs basic text separators, such as paragraphs and sentences, to recursively split the content. The goal remains to produce chunks approximately 2000 characters in size, aligning with the optimal chunk size determined for processing within the network. This approach ensures that, even in scenarios where the nuanced parsing and merging strategies of the primary method are not suitable, the system can still segment content into manageable, semantically coherent chunks. These chunks are then processed similarly to those generated by the primary method: they are inputted into an embedding generator, converted into logical text passage embeddings, indexed, and made retrievable in response to user queries.

This fallback logic ensures robustness and flexibility in the text processing pipeline, guaranteeing that the system can handle a wide variety of content types and structures efficiently. By providing an alternative method for chunking, the system maintains its capacity to generate meaningful responses to user queries, even when faced with content that does not conform to the expected markdown structures or when the primary chunking strategy is not optimal.

In an embodiment, when the token size limit of the embedding generator increases 140 (e.g., because the capability of the transformer model 165 improve), it allows for larger logical text passages to be processed simultaneously. This capability is particularly beneficial in dealing with complex or lengthy markup language documents where the text passages may need to be broken by the logical passage generator 130 down into smaller chunks to fit the previously lower token size limit of the embedding generator 140. With an increased token size limit of the embedding generator 140, previously generated smaller logical text passages can now be combined or merged into larger logical text passages. This merging process is based on the logical or semantic relationships between the pre-existing passages. For instance, sections of a markup language document that were previously separated due to size constraints but belong to the same overarching section or topic can now be unified into a single, larger logical text passage within the new limit.

This ability to combine smaller, semantically related logical text passages into larger ones within the new maximum chunk size limit has several advantages. Firstly, it can lead to a more coherent and contextual representation of the document's content, as larger passages can capture more of the document's narrative or argumentative flow. Secondly, this approach can improve the efficiency of the embedding process and the subsequent querying of the embedding index 150. By dealing with fewer, but larger, logical text passages, the system can reduce the overhead associated with processing a larger number of smaller logical text passages and potentially improve the relevance of the passages retrieved in response to a user query.

Moreover, when the embeddings generated by the embedding generator with the increased token size limit for these larger logical text passages replace the previously generated embeddings for the smaller pre-existing ones in the embedding index 150, it updates the index 150 to reflect a more integrated and comprehensive mapping of the document's content. This can enhance the system's ability to provide more accurate and contextually relevant responses to user queries, leveraging the more detailed and cohesive embeddings generated from these larger logical text passages.

There are different options for generating unique IDs for chunks. One option (Option 1) uses a combination of a universally unique identifier (UUID) assigned to the entire document and a sequential number for each chunk derived from the document. This method creates IDs like documentUUID_chunk1, documentUUID_chunk2, etc. The main advantage of this system is its simplicity and straightforwardness in tracking and updating chunks based on their sequence within a document. However, a significant downside is that any insertion of new content within the document necessitates updating the IDs (and potentially the content) of all subsequent chunks, leading to inefficiency and increased processing time, especially for documents that frequently change.

Another option is to generate unique IDs by applying a hash function (such as MD-5 or SHA-256) to the content of each chunk. This results in a unique identifier that directly corresponds to the chunk's content, such as hash(content (doc1_chunk1)). This method ensures that the ID is inherently tied to the specific content of the chunk, making it very effective at identifying duplicate content across different documents. However, it faces challenges when different documents contain identical chunks of content, as this would generate the same ID for these chunks, potentially conflating separate instances where the same content appears.

Yet another option integrates the strategies of the first two options by prefixing the hashed content of each chunk with the document's UUID, forming IDs like documentUUID-_hash(content(chunk1)). This hybrid approach mitigates the primary drawbacks of the other two methods. It preserves the uniqueness and content specificity of the chunk IDs while preventing the problem of identical chunks across different documents from sharing the same ID. Additionally, this method simplifies the process of updating and managing chunks within documents, as it allows for more efficient identification of changed, new, or removed chunks without requiring updates to the IDs of subsequent chunks when new content is inserted. This recommended option offers a balanced solution that enhances efficiency, accuracy, and manageability.

Figure 4:
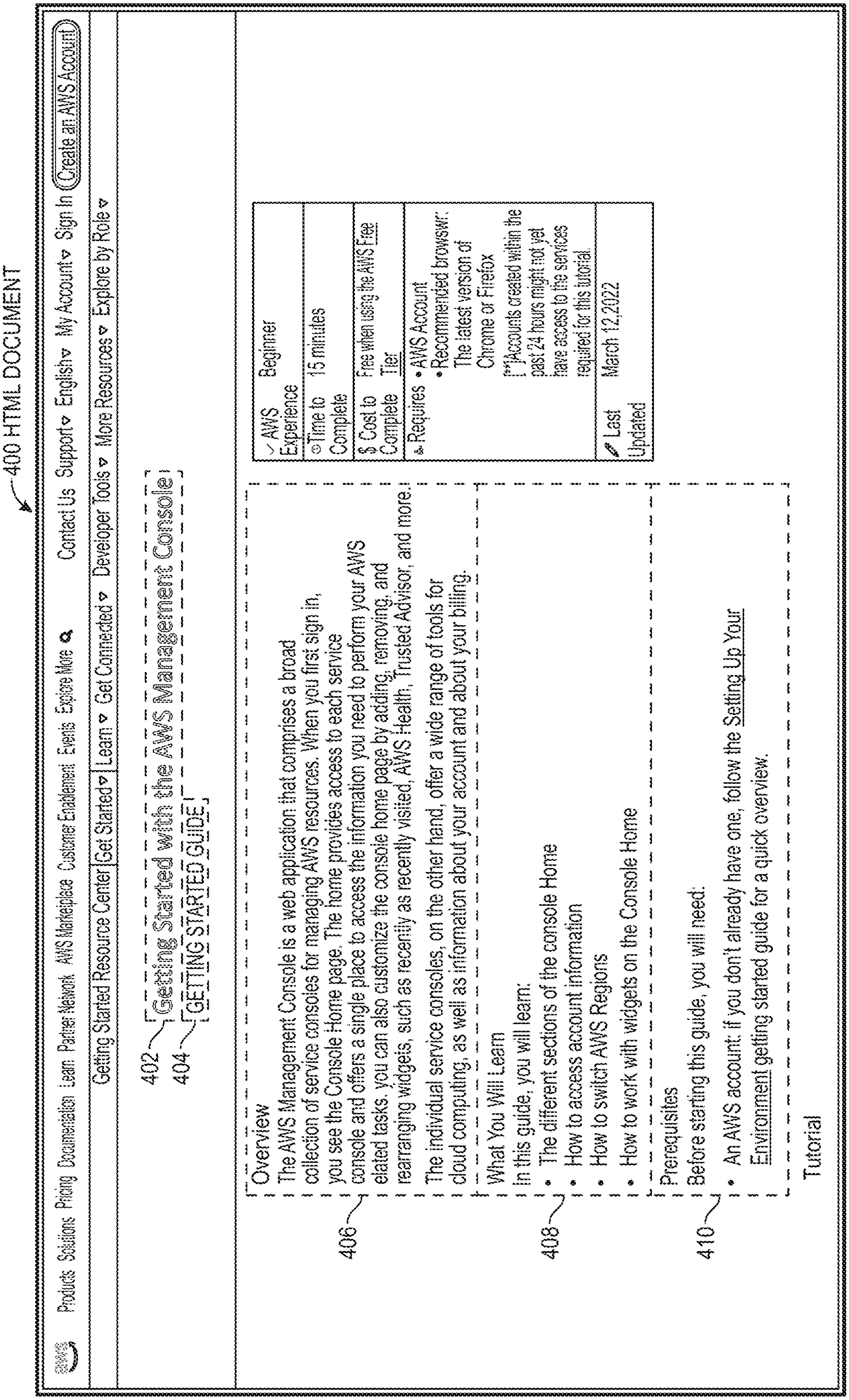
FIG. 4 depicts an example markup language document split into logical text passages.

FIG. 4 depicts a portion of an example markup language document 400 split into logical text passages 402, 404, 406, 408, and 410 according to techniques disclosed herein. In this example, the text passages are identified by recursive splitting of markdown content generated from document 400. This example illustrates the logical chunking of the markdown content by markdown separators in the markdown content. For example, each of logical text passages 406, 408, and 410 are identified based on a heading in the markdown headers corresponding to text headings "Overview," "What You Will Learn," and "Prerequisites," respectively.

FIG. 7 and FIG. 8 depict the logical text passages 402, 404, 406, 408, and 410 generated by the logical text passage generator 130 and in their form input to the embedding generator 140. Each logical text passage includes a metadata header (a set of one or more key-value pairs) followed by the text content in its markdown form. In an embodiment, only the text content of each logical text passage is inputted to the embedding generator 140 and the metadata header is omitted.

This example also illustrates the hierarchical nature of logical text passages as determined by the logical text passage generator 130 based on the markdown separators in the markdown content. In particular, text passage 402 is a parent of text passages 404, 406, 408, and 410. And each of text passages 404, 406, 408, and 410 is a child of text passage 402. This hierarchy is determined by the logical text passage generator 130 based on the hierarchical relationship of markdown separators in the markdown content as it recursively splits the markdown content based on the markdown separators. Recursion splitting of the markdown content involves breaking down a markdown document based on its markdown separators. By utilizing recursion, the process iterates through markdown separators, identifying parent and child relationships between them. For instance, a markdown header with a higher level (e.g., "\n ##") would be considered a parent to markdown headers with lower levels nested beneath it (e.g., "\n ###"). This recursive approach enables the establishment of a clear parent-child relationship between text passages. As the parsing progresses, each level is associated with its respective parent, forming a hierarchical tree-like structure. This structured representation facilitates various operations such as navigation, organization, and manipulation of the markdown content. It allows for the identification of text passages and their sub-passages.

This example also illustrates the linear nature of logical text passages as determined by the logical text passage generator 130 based on the markdown separators in the markdown content. In particular, text passages 404, 406, 408, and 410 are identified as belonging to the same "chain" of text passages based on passages 404, 406, 408, and 410 following each other in sequence in document 400 and passages 404, 406, 408, and 410 having the same parent text passage 402. Metadata headers in the text passages indicate the previous text passage in the chain (if there is one) and the next passage in the chain (if there is one). For example, the metadata headers of text passage 408 indicate that the next passage in the chain is text passage 410, and the previous passage in the chain is the text passage 406. The metadata headers can be used to reconstruct the hierarchy of the text passages including parent-child and sibling relationships between the text passages.

Figure 5:
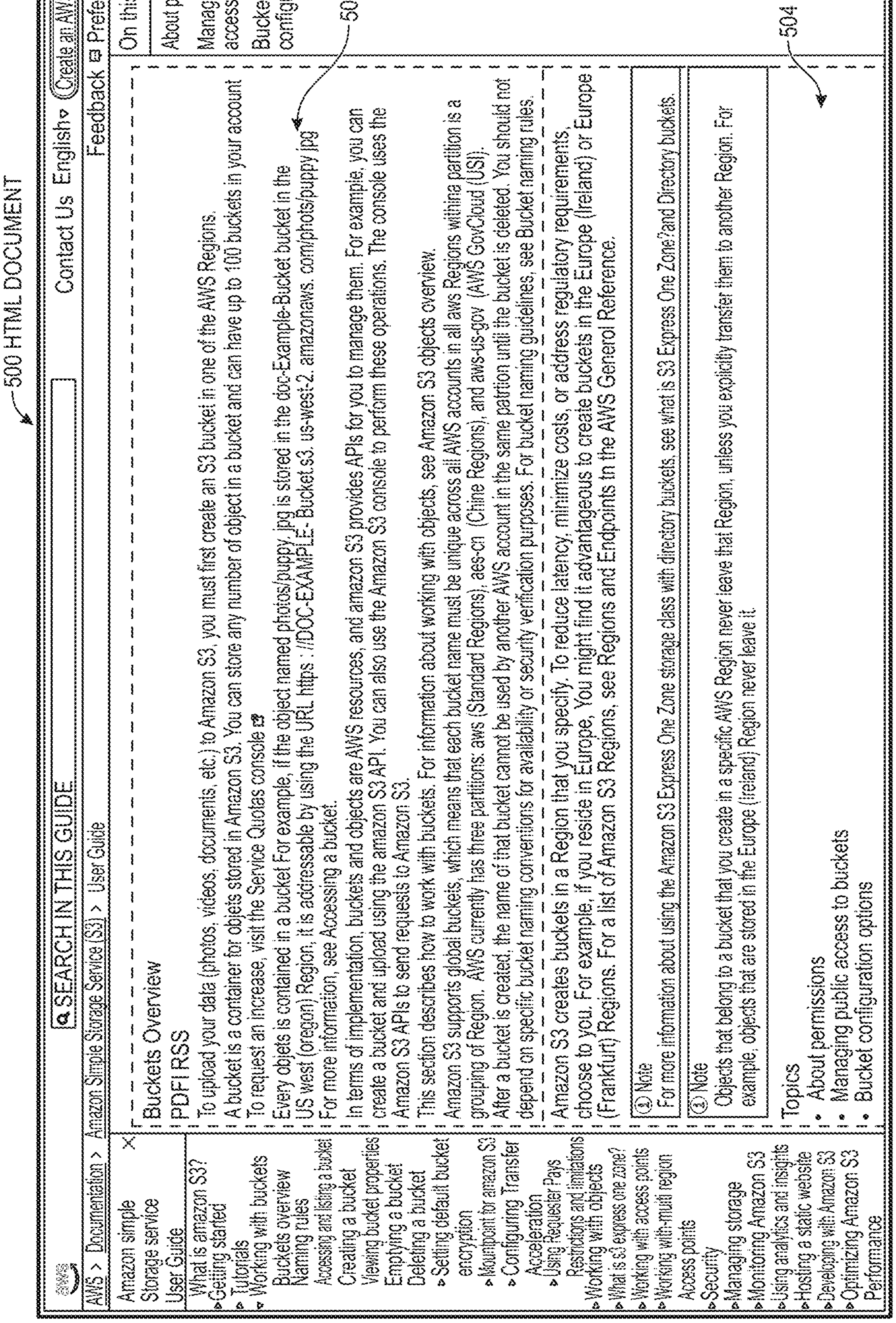
FIG. 5 depicts an example markup language document split into logical text passages.

FIG. 5 depicts a portion of an example markup language document 500 split into logical text passages 502 and 504. The corresponding text passages input into the embedding generator 140 are depicted in FIG. 9 and FIG. 10.

Figure 6:
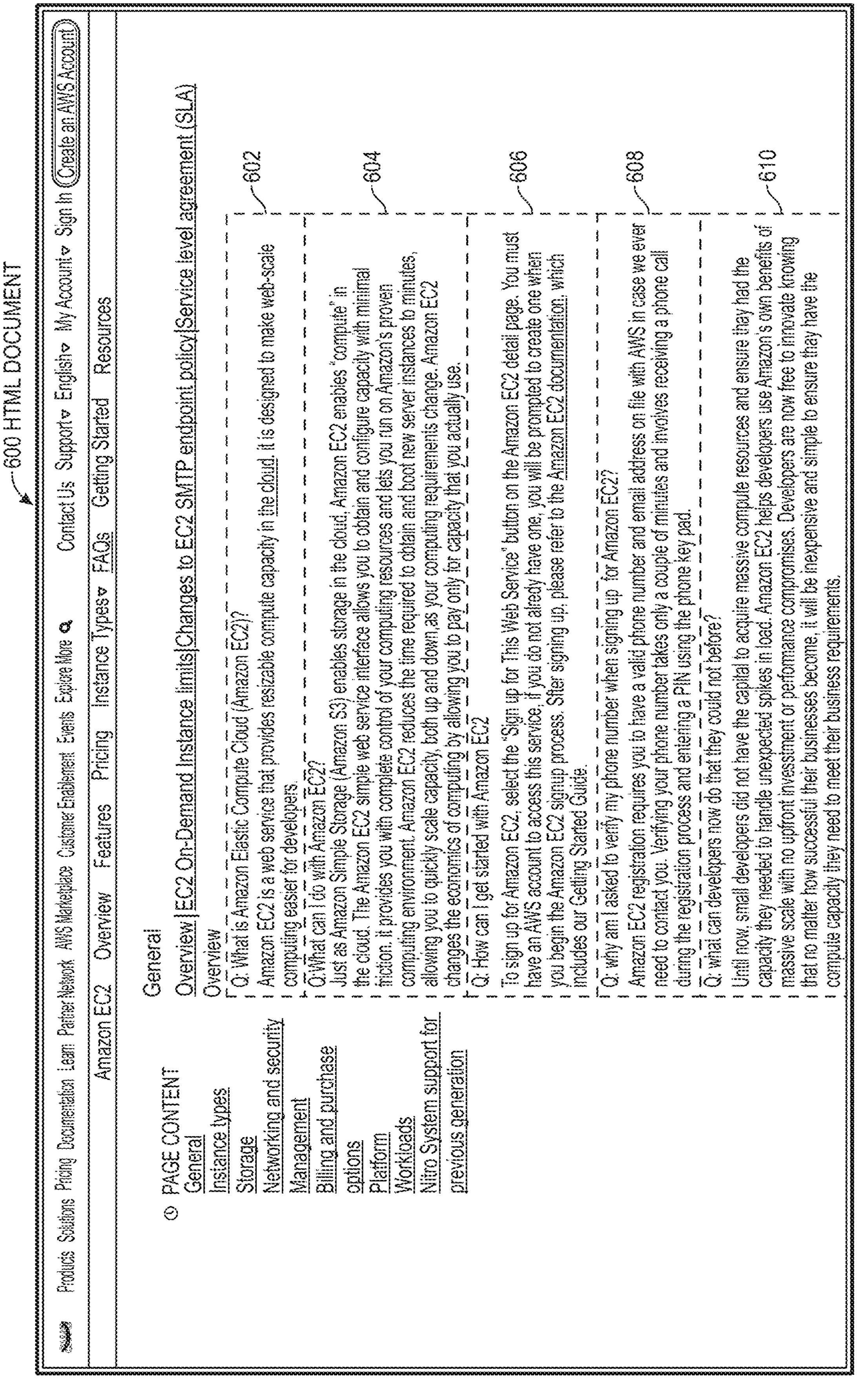
FIG. 6 depicts an example markup language document split into logical text passages.

FIG. 6 depicts a portion of an example markup language document 600 split into logical text passages 602, 604, 606, 608, and 610. In this example, document 600 is a FAQ-type document encompassing question and answer pairs. Accordingly, as depicted in FIG. 11 and FIG. 12, each question-and-answer pair is included in its own text passage.

Figure 13:
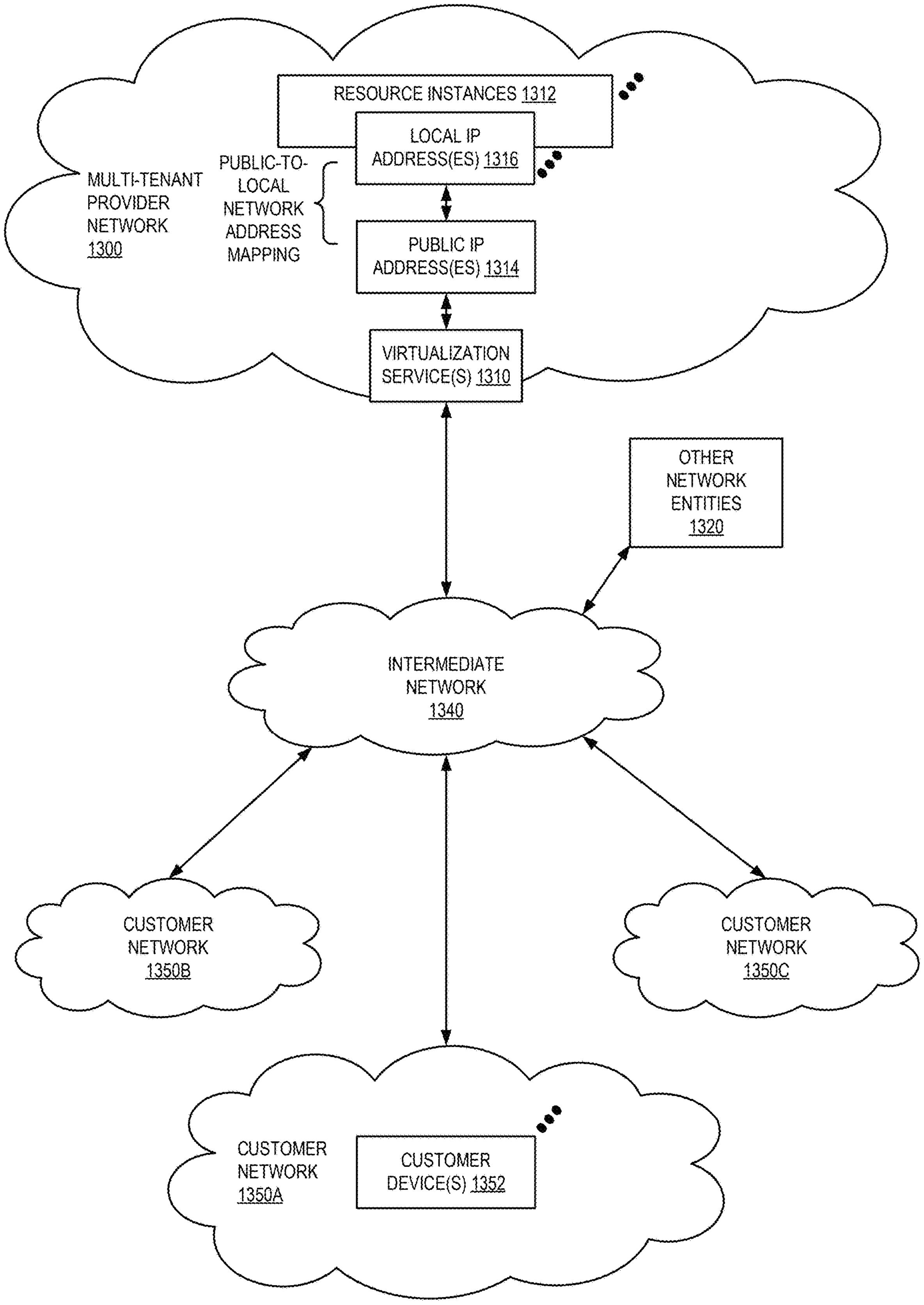
FIG. 13 illustrates an example multi-tenant provider network environment in which the techniques disclosed herein for logical text passage generation and retrieval for retrieval-augmented generation are implemented.

FIG. 13 illustrates an example multi-tenant provider network environment in which the techniques disclosed herein for logical text passage generation and retrieval for retrieval-augmented generation are implemented. A multi-tenant provider network 1300 provides resource virtualization to customers via one or more virtualization services 1310 that allow customers to purchase, rent, or otherwise obtain instances 1312 of virtualized resources, including but not limited to computation and storage resources, implemented on devices within the provider network or networks in one or more data centers. Local Internet Protocol (IP) addresses 1316 are associated with the resource instances 1312; the local IP addresses are the internal network addresses of the resource instances 1312 on the provider network 1300. The provider network 1300 provides public IP addresses 1314 or public IP address ranges (e.g., Internet Protocol version 4 (IPv4) or Internet Protocol version 6 (IPv6) addresses) that customers obtain from the provider network 1300.

The provider network 1300, via the virtualization services 1310, allows a customer of the service provider (e.g., a customer that operates one or more customer networks 1350A-1350C (or "client networks") including one or more customer device(s) 1352) to dynamically associate at least some public IP addresses 1314 assigned or allocated to the customer with resource instances 1312 assigned to the customer. The provider network 1300 also allows the customer to remap a public IP address 1314, previously mapped to one virtualized computing resource instance 1312 allocated to the customer, to another virtualized computing resource instance 1312 that is also allocated to the customer. Using the virtualized computing resource instances 1312 and public IP addresses 1314 provided by the service provider, a customer of the service provider such as the operator of the customer network(s) 1350A-1350C implement customer-specific applications and present the customer's applications on an intermediate network 1340, such as the Internet. Other network entities 1320 on the intermediate network 1340 then generate traffic to a destination public IP address 1314 published by the customer network(s) 1350A-1350C; the traffic is routed to the service provider data center, and at the data center is routed, via a network substrate, to the local IP address 1316 of the virtualized computing resource instance 1312 currently mapped to the destination public IP address 1314. Similarly, response traffic from the virtualized computing resource instance 1312 is routed via the network substrate back onto the intermediate network 1340 to the source entity 1320.

Local IP addresses, as used herein, refer to the internal or "private" network addresses, for example, of resource instances in a provider network. Local IP addresses are within address blocks reserved by Internet Engineering Task Force (IETF) Request for Comments (RFC) 1918 or of an address format specified by IETF RFC 4193 and is mutable within the provider network. Network traffic originating outside the provider network is not directly routed to local IP addresses; instead, the traffic uses public IP addresses that are mapped to the local IP addresses of the resource instances. The provider network 1300 includes networking devices or appliances that provide network address translation (NAT) or similar functionality to perform the mapping from public IP addresses to local IP addresses and vice versa.

Public IP addresses are Internet mutable network addresses that are assigned to resource instances, either by the service provider or by the customer. Traffic routed to a public IP address is translated, for example via 1:1 NAT, and forwarded to the respective local IP address of a resource instance. Some public IP addresses are assigned by the provider network infrastructure to particular resource instances; these public IP addresses are referred to as standard public IP addresses, or simply standard IP addresses. The mapping of a standard IP address to a local IP address of a resource instance is the default launch configuration for all resource instance types.

At least some public IP addresses are allocated to or obtained by customers of the provider network 1300; a customer then assigns their allocated public IP addresses to particular resource instances allocated to the customer. These public IP addresses are referred to as customer public IP addresses, or simply customer IP addresses. Instead of being assigned by the provider network 1300 to resource instances as in the case of standard IP addresses, customer IP addresses are assigned to resource instances by the customers, for example via an API provided by the service provider.

Unlike standard IP addresses, customer IP addresses are allocated to customer accounts and are remapped to other resource instances by the respective customers as necessary or desired. A customer IP address is associated with a customer's account, not a particular resource instance, and the customer controls that IP address until the customer chooses to release it. Unlike conventional static IP addresses, customer IP addresses allow the customer to mask resource instance or availability zone failures by remapping the customer's public IP addresses to any resource instance associated with the customer's account. The customer IP addresses enable a customer to engineer around problems with the customer's resource instances or software by remapping customer IP addresses to replacement resource instances.

Figure 14:
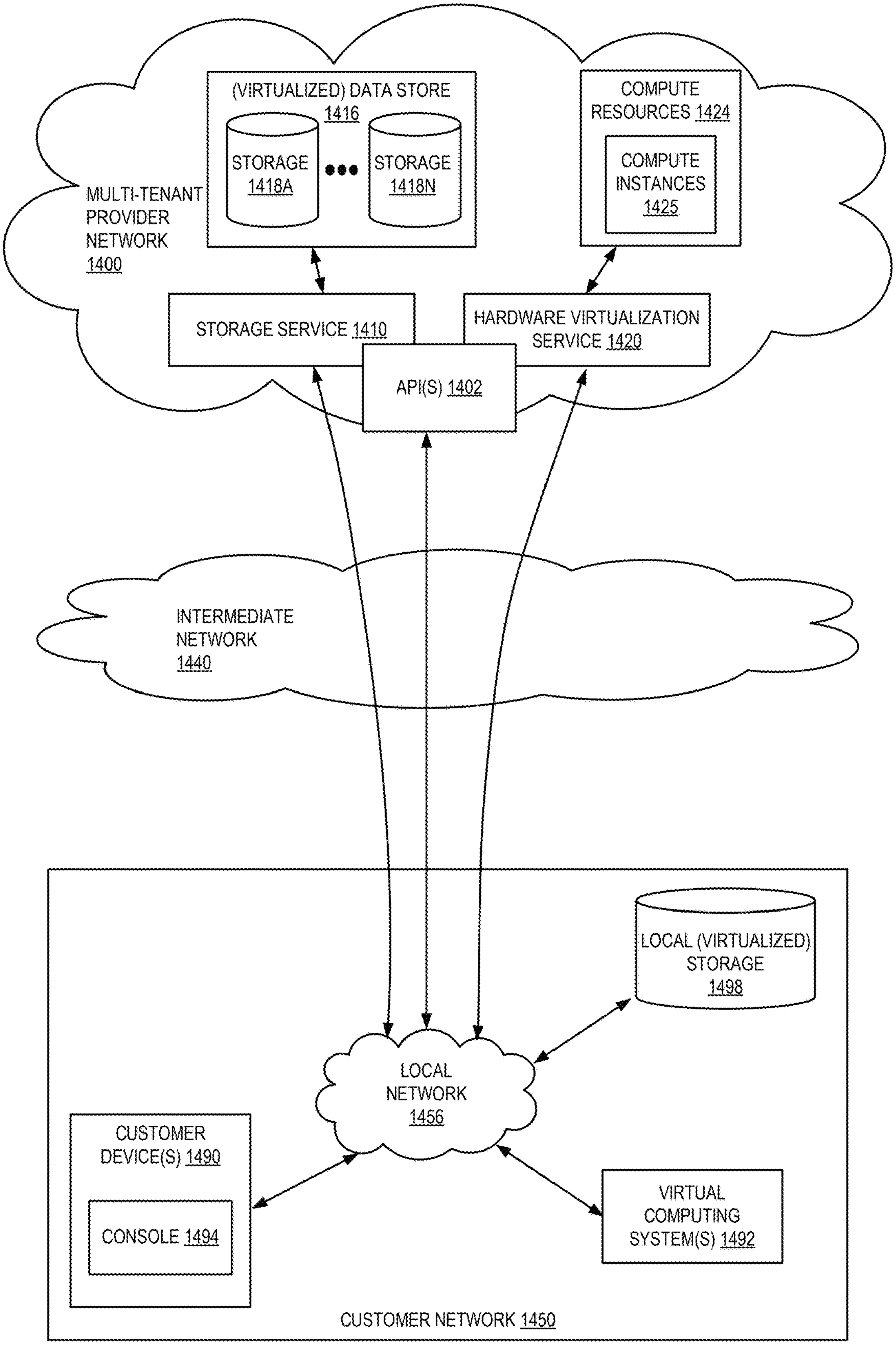
FIG. 14 illustrates an example multi-tenant provider network that provides a storage service and a hardware virtualization service to customers and in which the techniques disclosed herein for logical text passage generation and retrieval for retrieval-augmented generation implemented.

FIG. 14 illustrates an example multi-tenant provider network that provides a storage service and a hardware virtualization service to customers and in which the techniques disclosed herein for logical text passage generation and retrieval for retrieval-augmented generation are implemented. A hardware virtualization service 1420 provides multiple compute resources 1424 (e.g., compute instances 1425, such as VMs) to customers. The compute resources 1424 are provided as a service to customers of a provider network 1400 (e.g., to a customer that implements a customer network 1450). Each computation resource 1424 is provided with one or more local IP addresses. The provider network 1400 is configured to route packets from the local IP addresses of the compute resources 1424 to public Internet destinations, and from public Internet sources to the local IP addresses of the compute resources 1424.

The provider network 1400 provides the customer network 1450, for example coupled to an intermediate network 1440 via a local network 1456, the ability to implement virtual computing systems 1492 via the hardware virtualization service 1420 coupled to the intermediate network 1440 and to the provider network 1400. The hardware virtualization service 1420 provides one or more APIs 1402, for example a web services interface, via which the customer network 1450 accesses functionality provided by the hardware virtualization service 1420, for example via a console 1494 (e.g., a web-based application, standalone application, mobile application, etc.) of a customer device 1490. At the provider network 1400, each virtual computing system 1492 at the customer network 1450 corresponds to a computation resource 1424 that is leased, rented, or otherwise provided to the customer network 1450.

From an instance of the virtual computing system(s) 1492 or another customer device 1490 (e.g., via console 1494), the customer accesses the functionality of a storage service 1410, for example via the one or more APIs 1402, to access data from and store data to storage resources 1418A-1418N of a virtual data store 1416 (e.g., a folder or "bucket," a virtualized volume, a database, etc.) provided by the provider network 1400. A virtualized data store gateway (not shown) is provided at the customer network 1450 that locally caches at least some data, for example frequently accessed or critical data, and that communicates with the storage service 1410 via one or more communications channels to upload new or modified data from a local cache so that the primary store of data (the virtualized data store 1416) is maintained. In an embodiment, a user, via the virtual computing system 1492 or another customer device 1490, mounts and accesses virtual data store 1416 volumes via the storage service 1410 acting as a storage virtualization service, and these volumes appear to the user as local (virtualized) storage 1498.

While not shown in FIG. 14, the virtualization service(s) are accessed from resource instances within the provider network 1400 via the API(s) 1402. For example, a customer, appliance service provider, or other entity accesses a virtualization service from within a respective virtual network on the provider network 1400 via the API(s) 1402 to request allocation of one or more resource instances within the virtual network or within another virtual network.

Figure 15:
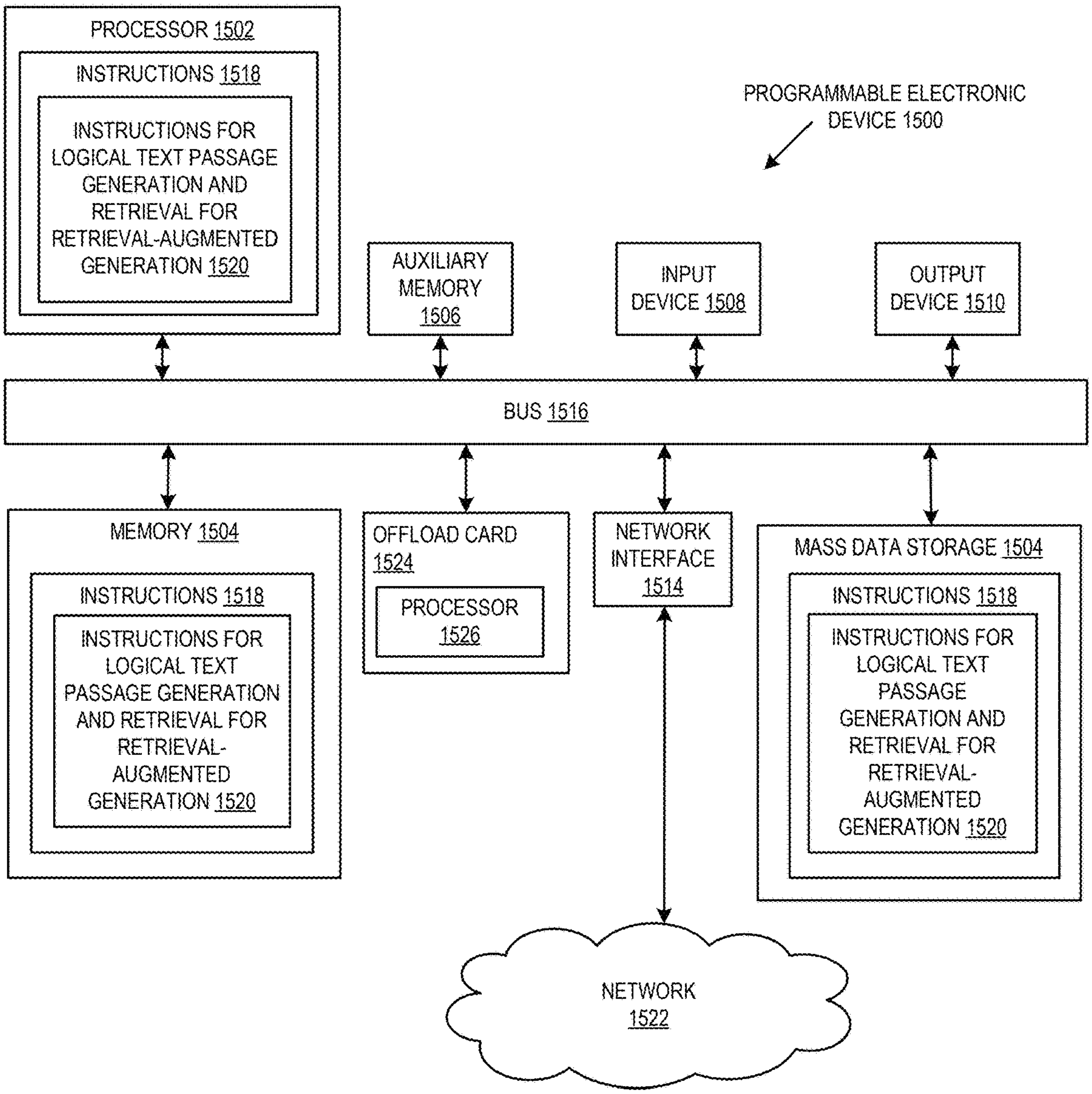
FIG. 15 illustrates an example of a programmable electronic device that processes and manipulates data to perform techniques disclosed herein for logical text passage generation and retrieval for retrieval-augmented generation.

FIG. 15 illustrates an example of a programmable electronic device that processes and manipulates data to perform techniques disclosed herein for logical text passage generation and retrieval for retrieval-augmented generation. Example programmable electronic device 1500 includes electronic components encompassing hardware or hardware and software including processor 1502, memory 1504, auxiliary memory 1506, input device 1508, output device 1510, mass data storage 1512, network interface 1514, and offload card 1524, all connected to bus 1516. Network 1522 is connected to, but not part of, programmable electronic device 1500.

While only one of each type of component is depicted in FIG. 15 for the purpose of providing a clear example, multiple instances of any or all these electronic components are present in device 1500 in other instances. For example, in an embodiment, multiple processors are connected to bus 1516. Accordingly, unless the context clearly indicates otherwise, reference with respect to FIG. 15 to a component of device 1500 in the singular such as, for example, processor 1502, is not intended to exclude the plural where, in a particular instance of device 1500, multiple instances of the electronic component are present. Further, some electronic components might not be present in a particular instance of device 1500. For example, device 1500 in a headless configuration such as, for example, when operating as a server racked in a data center, might not include, or be connected to, input device 1508 or output device 1510. As another example, offload card 1524 might be absent from device 1500 when not operating as a server racked in a data center as part of a cloud-based hosted compute service.

Processor 1502 is an electronic component that processes (e.g., executes, interprets, or otherwise processes) instructions 1518 including instructions 1520 for logical text passage generation and retrieval for retrieval-augmented generation. In an embodiment, processor 1502 fetches, decodes, and executes instructions 1518 from memory 1504 and performs arithmetic and logic operations dictated by instructions 1518 and coordinates the activities of other electronic components of device 1500 in accordance with instructions 1518. In an embodiment, processor 1502 is made using silicon wafers according to a manufacturing process (e.g., 7 nm, 5 nm, or 3 nm). In an embodiment, processor 1502 is configured to understand and execute a set of commands referred to as an instruction set architecture (ISA) (e.g., x86, x86_64, or ARM).

In an embodiment, processor 1502 includes a cache used to store frequently accessed instructions 1518 to speed up processing. In an embodiment, processor 1502 has multiple layers of cache (L1, L2, L3) with varying speeds and sizes.

In an embodiment, processor 1502 is composed of multiple cores where each such core is a processor within processor 1502. The cores allow processor 1502 to process multiple instructions 1518 at once in a parallel processing manner.

In an embodiment, processor 1502 supports multi-threading where each core of processor 1502 handles multiple threads (multiple sequences of instructions) at once to further enhance parallel processing capabilities.

In an embodiment, processor 1502 is any of the following types of central processing units (CPUs): a desktop processor for general computing, gaming, content creation, etc.; a server processor for data centers, enterprise-level applications, cloud services, etc.; a mobile processor for portable computing devices like laptops and tablets for enhanced battery life and thermal management; a workstation processor for intense computational tasks like 3D rendering and simulations; or any other type of CPU suitable for the particular implementation at hand.

While processor 1502 might be a CPU, processor 1502, in an embodiment, is any of the following types of processors: a graphics processing unit (GPU) capable of highly parallel computation allowing for processing of multiple calculations simultaneously and useful for rendering images and videos and for accelerating machine learning computation tasks; a digital signal processor (DSP) designed to process analog signals like audio and video signals into digital form and vice versa, commonly used in audio processing, telecommunications, and digital imaging; specialized hardware for machine learning workloads, especially those involving tensors (multi-dimensional arrays); a field-programmable gate array (FPGA) or other reconfigurable integrated circuit that is customized post-manufacturing for specific applications, such as cryptography, data analytics, and network processing; a neural processing unit (NPU) or other dedicated hardware designed to accelerate neural network and machine learning computations, commonly found in mobile devices and edge computing applications; an image signal processor (ISP) specialized in processing images and videos captured by cameras, adjusting parameters like exposure, white balance, and focus for enhanced image quality; an accelerated processing unit (APU) combing a CPU and a GPU on a single chip to enhance performance and efficiency, especially in consumer electronics like laptops and consoles; a vision processing unit (VPU) dedicated to accelerating machine vision tasks such as image recognition and video processing, typically used in drones, cameras, and autonomous vehicles; a microcontroller unit (MCU) or other integrated processor designed to control electronic devices, containing CPU, memory, and input/output peripherals; an embedded processor for integration into other electronic devices such as washing machines, cars, industrial machines, etc.; a system on a chip (SoC) such as those commonly used in smartphones encompassing a CPU integrated with other components like a graphics processing unit (GPU) and memory on a single chip; or any other type of processor suitable for the particular implementation at hand.

Memory 1504 is an electronic component that stores data and instructions 1518 that processor 1502 processes. In an embodiment, memory 1504 provides the space for the operating system, applications, and data in current use to be quickly reached by processor 1502. In an embodiment, memory 1504 is a random-access memory (RAM) that allows data items to be read or written in substantially the same amount of time irrespective of the physical location of the data items inside memory 1504.

In an embodiment, memory 1504 is a volatile or non-volatile memory. Data stored in a volatile memory is lost when the power is turned off. Data in non-volatile memory remains intact even when the system is turned off. In an embodiment, memory 1504 is Dynamic RAM (DRAM). DRAM such as Single Data Rate RAM (SDRAM) or Double Data Rate RAM (DDRAM) is volatile memory that stores each bit of data in a separate capacitor within an integrated circuit. The capacitors of DRAM leak charge and need to be periodically refreshed to avoid information loss. In an embodiment, memory 1504 is Static RAM (SRAM). SRAM is volatile memory that is typically faster but more expensive than DRAM. SRAM uses multiple transistors for each memory cell but does not need to be periodically refreshed. Additionally, or alternatively, SRAM is used for cache memory in processor 1502 in an embodiment. In an embodiment, memory 1504 encompasses both DRAM and SRAM.

Device 1500 has auxiliary memory 1506 other than memory 1504. Examples of auxiliary memory 1506 include cache memory, register memory, read-only memory (ROM), secondary storage, virtual memory, memory controller, and graphics memory. In an embodiment, device 1500 has multiple auxiliary memories including different types of auxiliary memories.

Cache memory is found inside or very close to processor 1502 and is typically faster but smaller than memory 1504. Cache memory is used to hold frequently accessed instructions 1518 (encompassing any associated data) to speed up processing. In an embodiment, cache memory is hierarchical ranging from Level 1 cache memory which is the smallest but fastest cache memory and is typically inside processor 1502 to Level 2 and Level 3 cache memory which are progressively larger and slower cache memories that are inside or outside processor 1502.

Register memory is a small but very fast storage location within processor 1502 designed to hold data temporarily for ongoing operations.

ROM is a non-volatile memory device that is only read, not written to. In an embodiment, ROM is a Programmable ROM (PROM), Erasable PROM (EPROM), or electrically erasable PROM (EEPROM). In an embodiment, ROM stores basic input/output system (BIOS) instructions which help device 1500 boot up.

Secondary storage is a non-volatile memory. In an embodiment, secondary storage encompasses any or all of: a hard disk drive (HDD) or other magnetic disk drive device; a solid-state drive (SSD) or other NAND-based flash memory device; an optical drive like a CD-ROM drive, a DVD drive, or a Blu-ray drive; or flash memory device such as a USB drive, an SD card, or other flash storage device.

Virtual memory is a portion of a hard drive or an SSD that the operating system uses as if it were memory 1504. When memory 1504 gets filled, less frequently accessed data and instructions 1518 is "swapped" out to the virtual memory. The virtual memory is slower than memory 1504, but it provides the illusion of having a larger memory 1504.

A memory controller manages the flow of data and instructions 1518 to and from memory 1504. The memory controller is located either on the motherboard of device 1500 or within processor 1502.

Graphics memory is used by a graphics processing unit (GPU) and is specially designed to handle the rendering of images, videos, graphics, or performing machine learning calculations. Examples of graphics memory include graphics double data rate (GDDR) such as GDDR5 and GDDR6.

Input device 1508 is an electronic component that allows users to feed data and control signals into device 1500. Input device 1508 translates a user's action or the data from the external world into a form that device 1500 processes. Examples of input device 1508 include a keyboard, a pointing device (e.g., a mouse), a touchpad, a touchscreen, a microphone, a scanner, a webcam, a joystick/game controller, a graphics tablet, a digital camera, a barcode reader, a biometric device, a sensor, and a MIDI instrument.

Output device 1510 is an electronic component that conveys information from device 1500 to the user or to another device. The information is in the form of text, graphics, audio, video, or other media representation. Examples of output device 1510 include a monitor or display device, a printer device, a speaker device, a headphone device, a projector device, a plotter device, a braille display device, a haptic device, a LED or LCD panel device, a sound card, and a graphics or video card.

Mass data storage 1512 is an electronic component used to store data and instructions 1518. In an embodiment, mass data storage 1512 is non-volatile memory. Examples of mass data storage 1512 include a hard disk drive (HDD), a solid-state drive (SDD), an optical drive, a flash memory device, a magnetic tape drive, a floppy disk, an external drive, or a RAID array device.

In an embodiment, mass data storage 1512 is additionally or alternatively connected to device 1500 via network 1522. In an embodiment, mass data storage 1512 encompasses a network attached storage (NAS) device, a storage area network (SAN) device, a cloud storage device, or a centralized network filesystem device.

Network interface 1514 (sometimes referred to as a network interface card, NIC, network adapter, or network interface controller) is an electronic component that connects device 1500 to network 1522. Network interface 1514 functions to facilitate communication between device 1500 and network 1522. Examples of a network interface 1514 include an ethernet adaptor, a wireless network adaptor, a fiber optic adapter, a token ring adaptor, a USB network adaptor, a Bluetooth adaptor, a modem, a cellular modem or adapter, a powerline adaptor, a coaxial network adaptor, an infrared (IR) adapter, an ISDN adaptor, a VPN adaptor, and a TAP/TUN adaptor.

Bus 1516 is an electronic component that transfers data between other electronic components of or connected to device 1500. Bus 1516 serves as a shared highway of communication for data and instructions (e.g., instructions 1518), providing a pathway for the exchange of information between components within device 1500 or between device 1500 and another device. Bus 1516 connects the different parts of device 1500 to each other. In an embodiment, bus 1516 encompasses one or more of: a system bus, a front-side bus, a data bus, an address bus, a control bus, an expansion bus, a universal serial bus (USB), a I/O bus, a memory bus, an internal bus, an external bus, and a network bus.

Instructions 1518 are computer-processable instructions that take different forms. In an embodiment, instructions 1518 are in a low-level form such as binary instructions, assembly language, or machine code according to an instruction set (e.g., x86, ARM, MIPS) that processor 1502 is designed to process. In an embodiment, instructions 1518 include individual operations that processor 1502 is designed to perform such as arithmetic operations (e.g., add, subtract, multiply, divide, etc.); logical operations (e.g., AND, OR, NOT, XOR, etc.); data transfer operations including moving data from one location to another such as from memory 1504 into a register of processor 1502 or from a register to memory 1504; control instructions such as jumps, branches, calls, and returns; comparison operations; and specialization operations such as handling interrupts, floating-point arithmetic, and vector and matrix operations. In an embodiment, instructions 1518 are in a higher-level form such as programming language instructions in a high-level programming language such as Python, Java, C++, etc. In an embodiment, instructions 1518 are in an intermediate level form in between a higher-level form and a low-level form such as bytecode or an abstract syntax tree (AST).

Instructions 1518 for processing by processor 1502 are in different forms at the same or different times. In an embodiment, when stored in mass data storage 1512 or memory 1504, instructions 1518 are stored in a higher-level form such as Python, Java, or other high-level programing language instructions, in an intermediate-level form such as Python or Java bytecode that is compiled from the programming language instructions, or in a low-level form such as binary code or machine code. In an embodiment, when stored in processor 1502, instructions 1518 are stored in a low-level form such as binary instructions, assembly language, or machine code according to an instruction set architecture (ISA). In an embodiment, instructions 1518 are stored in processor 1502 in an intermediate level form or even a high-level form where CPU 1502 processes instructions in such form.

Instructions 1518 are processed by one or more processors of device 1500 using a processing model such as any or all of the following processing models: sequential execution where instructions are processed one after another in a sequential manner; pipelining where pipelines are used to process multiple instruction phases concurrently; multiprocessing where different processors different instructions concurrently, sharing the workload; thread-level parallelism where multiple threads run in parallel across different processors; simultaneous multithreading or hyperthreading where a single processor processes multiple threads simultaneously, making it appear as multiple logical processors; multiple instruction issue where multiple instruction pipelines allow for the processing of several instructions during a single clock cycle; parallel data operations where a single instruction is used to perform operations on multiple data elements concurrently; clustered or distributed computing where multiple processors in a network (e.g., in the cloud) collaboratively process the instructions, distributing the workload across the network; graphics processing unit (GPU) acceleration where GPUs with their many processors allow the processing of numerous threads in parallel, suitable for tasks like graphics rendering and machine learning; asynchronous execution where processing of instructions is driven by events or interrupts, allowing the one or more processors to handle tasks asynchronously; concurrent instruction phases where multiple instruction phases (e.g., fetch, decode, execute) of different instructions are handled concurrently; parallel task processing where different processors handle different tasks or different parts of data, allowing for concurrent processing and execution; or any other processing model suitable to meet the requirements of the particular implementation at hand.

Network 1522 is a collection of interconnected computers, servers, and other programmable electronic devices that allow for the sharing of resources and information. Network 1522 ranges in size from just two connected devices to a global network (e.g., the internet) with many interconnected devices. In an embodiment, network 1522 encompasses network devices such as routers, switches, hubs, modems, and access points.

Individual devices on network 1522 are sometimes referred to as "network nodes." Network nodes communicate with each other through mediums or channels sometimes referred to as "network communication links." The network communication links are wired (e.g., twisted-pair cables, coaxial cables, or fiber-optic cables) or wireless (e.g., Wi-Fi, radio waves, or satellite links). Network nodes follow a set of rules sometimes referred to "network protocols" that define how the network nodes communicate with each other. Example network protocols include data link layer protocols such as Ethernet and Wi-Fi, network layer protocols such as IP (Internet Protocol), transport layer protocols such as TCP (Transmission Control Protocol), application layer protocols such as HTTP (Hypertext transfer Protocol) and HTTPS (HTTP Secure), and routing protocols such as OSPF (Open Shortest Path First) and BGP (Border Gateway Protocol).

Network 1522 has a particular physical or logical layout or arrangement sometimes referred to as a "network topology." Example network topologies include bus, star, ring, and mesh. In an embodiment, network 1522 encompasses any or all of the following categories of networks: a personal area network (PAN) that covers a small area (a few meters), like a connection between a computer and a peripheral device via Bluetooth; a local area network (LAN) that covers a limited area, such as a home, office, or campus; a metropolitan area network (MAN) that covers a larger geographical area, like a city or a large campus; a wide area network (WAN) that spans large distances, often covering regions, countries, or even globally (e.g., the internet); a virtual private network (VPN) that provides a secure, encrypted network that allows remote devices to connect to a LAN over a WAN; an enterprise private network (EPN) build for an enterprise, connecting multiple branches or locations of a company; or a storage area network (SAN) that provides specialized, high-speed block-level network access to storage using high-speed network links like Fibre Channel.

Device 1500 includes offload card 1524. Offload card 1524 includes its own processor 1526. Although not depicted in FIG. 1, offload card 1524 In an embodiment also includes network interface 1514. Offload card 1524 is connected to bus 1516 via a Peripheral Component Interconnect-Express (PCI-E) standard or another suitable interconnect standard such as, for example, a QuickPath interconnect (QPI) standard or an UltraPath interconnect (UPI) standard.

In an embodiment, device 1500 includes offload card 1524 when device 1500 acts as a host electronic device such as, for example, when operating as part of a hosted compute service. In this case, device 1500 hosts compute instances such as, for example, virtual machine instances or application container instances and offload card 1524 and processor 1526 run a hosted compute manager application that manages the hosted compute instances that run on device 1500 and processor 1502. In an embodiment, the hosted compute manager application performs hosted compute instance management operations, such as pausing or un-pausing hosted compute instances, launching or terminating hosted compute instances, performing memory transfer/copying operations, or other suitable hosted compute instance management operations. These management operations, In an embodiment, are performed by the hosted compute manager application in coordination with a hypervisor (e.g., upon a request from the hypervisor) that runs on device 1500 and processor 1502. However, In an embodiment, the hosted compute manager application is configured to process requests from other entities (e.g., from the hosted compute instances themselves), and does not coordinate with a hypervisor on device 1500.

Terminology

As used herein and in the appended claims, the term "computer-readable media" refers to one or more mediums or devices that store or transmit information in a format that a computer system accesses. Computer-readable media encompasses both storage media and transmission media. Storage media includes volatile and non-volatile memory devices such as RAM devices, ROM devices, secondary storage devices, register memory devices, memory controller devices, graphics memory devices, and the like. Transmission media includes wired and wireless physical pathways that carry communication signals such as twisted pair cable, coaxial cable, fiber optic cable, radio waves, microwaves, infrared, visible light communication, and the like.

As used herein and in the appended claims, the term "non-transitory computer-readable media" encompasses computer-readable media as just defined but excludes transitory, propagating signals. Data stored on non-transitory computer-readable media isn't just momentarily present and fleeting but has some degree of persistence. For example, instructions stored in a hard drive, a SSD, an optical disk, a flash drive, or other storage media are stored on non-transitory computer-readable media. Conversely, data carried by a transient electrical or electromagnetic signal or wave is not stored in non-transitory computer-readable media when so carried.

As used herein and in the appended claims, unless otherwise clear in context, the terms "comprising," "having," "containing," "including," "encompassing," "in response to," "based on," and the like are intended to be open-ended in that an element or elements following such a term is not meant to be an exhaustive listing of elements or meant to be limited to only the listed element or elements.

Unless otherwise clear in context, relational terms such as "first" and "second" are used herein and in the appended claims to differentiate one thing from another without limiting those things to a particular order or relationship. For example, unless otherwise clear in context, a "first device" could be termed a "second device." The first and second devices are both devices, but not the same device.

Unless otherwise clear in context, the indefinite articles "a" and "an" are used herein and in the appended claims to mean "one or more" or "at least one." For example, unless otherwise clear in context, "in an embodiment" means in at least one embodiment, but not necessarily more than one embodiment. Accordingly, unless otherwise clear in context, phrases such as "a device configured to" are intended to include one or more recited devices. Such one or more recited devices, unless otherwise clear in context, are collectively configured to carry out the stated recitations. For example, "a processor configured to carry out recitations A, B and C" encompasses both (a) a single processor configured to carry out recitations A, B, and C and (b) a first processor configured to carry out recitation A working in conjunction with a second processor configured to carry out recitations B and C.

Unless otherwise clear in context, the terms "set," and "collection" should generally be interpreted to include one or more described items throughout this application. Accordingly, unless otherwise clear in context, phrases such as "a set of devices configured to" or "a collection of devices configured to" are intended to include one or more recited devices. Such one or more recited devices, unless otherwise clear in context, are collectively configured to carry out the stated recitations. For example, "a set of servers configured to carry out recitations A, B and C" encompasses both (a) a single server configured to carry out recitations A, B, and C and (b) a first server configured to carry out recitations A and B working in conjunction with a second server configured to carry out recitation C.

As used herein, unless otherwise clear in context, the term "or" is open-ended and encompasses all possible combinations, except where infeasible. For example, if it is stated that a component includes A or B, then, unless infeasible or otherwise clear in context, the component includes at least A, or at least B, or at least A and B. As a second example, if it is stated that a component includes A, B, or C then, unless infeasible or otherwise clear in context, the component includes at least A, or at least B, or at least C, or at least A and B, or at least A and C, or at least B and C, or at least A and B and C.

Unless the context clearly indicates otherwise, conjunctive language in this description and in the appended claims such as the phrase "at least one of X, Y, and Z," is to be understood to convey that an item, term, etc. is either X, Y, or Z, or a combination thereof. Thus, such conjunctive language does not require that at least one of X, at least one of Y, and at least one of Z to each be present.

Unless the context clearly indicates otherwise, the relational term "based on" is used in this description and in the appended claims in an open-ended fashion to describe a logical (e.g., a condition precedent) or causal connection or association between two stated things where one of the things is the basis for or informs the other without requiring or foreclosing additional unstated things that affect the logical or casual connection or association between the two stated things.

Unless the context clearly indicates otherwise, the relational term "in response to" or "responsive to" is used in this description and in the appended claims in an open-ended fashion to describe a stated action or behavior that is done as a reaction or reply to a stated stimulus without requiring or foreclosing additional unstated stimuli that affect the relationship between the stated action or behavior and the stated stimulus.

What is claimed is:

1. A method comprising:

at a multi-tenant provider network in a multi-tenant provider network environment comprising the multi-tenant provider network, a client, and an intermediate network:

inputting a set of markup language documents into a logical text passage generator in the multi-tenant provider network;

generating, by the logical text passage generator, a set of logical text passages from the set of markup language documents;

inputting the set of logical text passages into an embedding generator in the multi-tenant provider network;

generating, by the embedding generator, a set of logical text passage embeddings from the set of logical text passages;

indexing, in an embedding index in the multi-tenant provider network, the set of logical text passages by the set of logical text passage embeddings;

receiving, at a dialog manager in the multi-tenant provider network, a user utterance of a user-agent conversation;

inputting, by the dialog manager, a user query into the embedding generator, the user query comprising the user utterance or generated based on the user utterance;

generating, by the embedding generator, a logical text passage embedding from the user query;

querying, by the dialog manager, the embedding index using the logical text passage embedding;

receiving, by the dialog manager, a set of one or more logical text passages identified in the embedding index that are relevant to the user query;

prompting, by the dialog manger, a large language model with a prompt that comprises the set of one or more logical text passages that are relevant to the user query;

receiving, by the dialog manager, a completion to the prompt generated by the large language model; and sending, by the dialog manager, a response to the user utterance that comprises or that is generated based on the completion.

2. The method of claim 1, wherein generating, by the logical text passage generator, the set of logical text passages from the set of markup language documents comprises:

generating, by the logical text passage generator, markdown content from the set of logical text passages; and generating, by the logical text passage generator, the set of logical text passages based on markdown separators in the markdown content.

3. The method of claim 1, wherein generating, by the logical text passage generator, the set of logical text passages from the set of markup language documents comprises:

generating, by the logical text passage generator, markdown content from the set of logical text passages; and generating, by the logical text passage generator, the set of logical text passages based on markdown headers in the markdown content.

4. A method comprising:

generating a set of logical text passages from a set of markup language documents;

generating a set of logical text passage embeddings from the set of logical text passages;

indexing, in an embedding index, the set of logical text passages by the set of logical text passage embeddings;

receiving a user utterance of a user-agent conversation;

generating a logical text passage embedding from a user query, wherein the user query comprises or is generated based on the user utterance;

querying the embedding index using the logical text passage embedding;

receiving a set of one or more logical text passages identified in the embedding index that are relevant to the user query;

prompting a large language model with a prompt that comprises the set of one or more logical text passages that are relevant to the user query;

receiving a completion to the prompt generated by the large language model; and sending a response to the user utterance that comprises or that is generated based on the completion.

5. The method of claim 4, wherein generating the set of logical text passages from the set of markup language documents comprises:

generating markdown content from the set of logical text passages; and generating the set of logical text passages based on markdown separators in the markdown content.

6. The method of claim 4, wherein generating the set of logical text passages from the set of markup language documents comprises:

generating markdown content from the set of logical text passages; and generating the set of logical text passages based on markdown headers in the markdown content.

7. The method of claim 4, wherein generating the set of logical text passages from the set of markup language documents comprises:

converting a markup language document, of the set of markup language documents, to markdown content;

splitting the markdown content into a set of chunks based on markdown separators of the markdown content;

determining to merge two or more semantically related chunks, of the set of chunks, to yield a single chunk; and generating a logical text passage, of the set of logical text passages, based on the single chunk.

8. The method of claim 4, wherein generating the set of logical text passages from the set of markup language documents comprises:

using a trained convolutional neural network to segment images of the set of markup language documents into image segments; and generating the set of logical text passages from the image segments.

9. The method of claim 4, wherein generating the set of logical text passages from the set of markup language documents comprises:

converting a markup language document, of the set of markup language documents, to markdown content;

splitting the markdown content into a set of chunks based on markdown headers of the markdown content; and generating one or more logical text passages, of the set of logical text passages, based on the set of chunks.

10. The method of claim 4, wherein generating the set of logical text passages from the set of markup language documents comprises:

converting a markup language document, of the set of markup language documents, to markdown content;

wherein converting the markup language document to the markdown content comprises using a custom markdown separator to designate a programming language source code in the markdown content;

splitting the markdown content into a set of chunks based on markdown separators of the markdown content;

generating one or more logical text passages, of the set of logical text passages, based on the set of chunks;

wherein generating the set of logical text passage embeddings from the set of logical text passages comprises generating a logical text passage embedding, of the set of logical text passage embeddings, from a logical text passage of the one or more logical text passages;

wherein the logical text passage comprises the custom markdown separator designating the programming language source code in the logical text passage; and wherein generating the logical text passage embedding from the logical text passage comprises omitting, based on the custom markdown separator, the programming language source code when generating the logical text passage embedding from the logical text passage.

11. The method of claim 4, further comprising:

selecting a maximum chunk size based on a token size limit of an embedding generator;

generating the set of logical text passages from the set of markup language documents based on the maximum chunk size; and generating the set of logical text passage embeddings from the set of logical text passages using the embedding generator.

12. The method of claim 4, wherein:

a markup language document of the set of markup language documents comprises a plurality of question and answer pairs;

generating the set of logical text passages from the set of markup language documents comprises generating one or more logical text passages from the markup language document;

each logical text passage of the one or more logical text passages generated from the markup language document comprises a respective one question and answer pair of the plurality of question and answer pairs.

13. The method of claim 4, wherein each logical text passage of the set of logical text passages comprises a Universally Unique IDentifier (UUID) for the logical text passage.

14. The method of claim 4, wherein the set of markup language documents comprises a set of HyperText Markup Language (HTML) documents.

15. A system comprising:

a first set of one or more programmable electronic devices to implement a data storage service in a multi-tenant provider network, the data storage service for storing data comprises a set of markup language documents;

a second set of one or more programmable electronic devices to implement a generative artificial intelligence (AI) assistant service in a multi-tenant provider network, the generative AI assistant service comprising instructions which, when executed by one or more processors of the second set of one or more programmable electronic devices, cause the generative AI Assistant service to perform:

generating a set of logical text passages from the set of markup language documents;

generating a set of logical text passage embeddings from the set of logical text passages;

indexing, in an embedding index, the set of logical text passages by the set of logical text passage embeddings;

receiving a user utterance of a user-agent conversation;

generating a logical text passage embedding from a user query, wherein the user query comprises or is generated based on the user utterance;

querying the embedding index using the logical text passage embedding;

receiving a set of one or more logical text passages identified in the embedding index that are relevant to the user query;

prompting a large language model with a prompt that comprises the set of one or more logical text passages that are relevant to the user query;

receiving a completion to the prompt generated by the large language model; and sending a response to the user utterance that comprises or that is generated based on the completion.

16. The system of claim 15, further comprising instructions which, when executed by one or more processors of the second set of one or more programmable electronic devices, cause the generative AI Assistant service to perform:

generating markdown content from the set of logical text passages; and generating the set of logical text passages based on markdown separators in the markdown content.

17. The system of claim 15, further comprising instructions which, when executed by one or more processors of the second set of one or more programmable electronic devices, cause the generative AI Assistant service to perform:

generating markdown content from the set of logical text passages; and generating the set of logical text passages based on markdown headers in the markdown content.

18. The system of claim 15, further comprising instructions which, when executed by one or more processors of the second set of one or more programmable electronic devices, cause the generative AI assistant service to perform:

converting a markup language document, of the set of markup language documents, to markdown content;

splitting the markdown content into a set of chunks based on markdown separators of the markdown content;

determining to merge two or more semantically related chunks, of the set of chunks, to yield a single chunk; and generating a logical text passage, of the set of logical text passages, based on the single chunk.

19. The system of claim 15, further comprising instructions which, when executed by one or more processors of the second set of one or more programmable electronic devices, cause the generative AI Assistant service to perform:

converting a markup language document, of the set of markup language documents, to markdown content;

splitting the markdown content into a set of chunks based on markdown separators of the markdown content; and generating one or more logical text passages, of the set of logical text passages, based on the set of chunks.

20. The system of claim 15, further comprising instructions which, when executed by one or more processors of the second set of one or more programmable electronic devices, cause the generative AI Assistant service to perform:

converting a markup language document, of the set of markup language documents, to markdown content;

splitting the markdown content into a set of chunks based on markdown headers of the markdown content; and generating one or more logical text passages, of the set of logical text passages, based on the set of chunks.

* * * * *